(12) United States Patent
Chatterji et al.

(10) Patent No.: US 8,505,630 B2
(45) Date of Patent: Aug. 13, 2013

(54) CONSOLIDATING SPACER FLUIDS AND METHODS OF USE

(71) Applicant: Halliburton Energy Services, Inc., Houston, TX (US)

(72) Inventors: Jiten Chatterji, Duncan, OK (US); D. Chad Brenneis, Marlow, OK (US); Crystal L. Keys, Indiahoma, OK (US); James R. Benkley, Duncan, OK (US); Craig W. Roddy, Duncan, OK (US); Ronnie G. Morgan, Waurika, OK (US); Rickey L. Morgan, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/725,833

(22) Filed: Dec. 21, 2012

(65) Prior Publication Data
US 2013/0112405 A1    May 9, 2013

Related U.S. Application Data

(63) Continuation-in-part of application No. 13/535,145, filed on Jun. 27, 2012, which is a continuation-in-part of application No. 12/895,436, filed on Sep. 30, 2010, which is a continuation-in-part of application No. 12/264,010, filed on Nov. 3, 2008, now Pat. No. 8,333,240, which is a continuation-in-part of application No. 11/223,669, filed on Sep. 9, 2005, now Pat. No. 7,445,669.

(51) Int. Cl.
*E21B 33/16* (2006.01)
*C09K 8/40* (2006.01)

(52) U.S. Cl.
USPC ........... 166/291; 166/292; 166/293; 507/202; 507/269; 507/928

(58) Field of Classification Search
None
See application file for complete search history.

(56) References Cited

U.S. PATENT DOCUMENTS

| | | | |
|---|---|---|---|
| 2,021,956 | A | 11/1935 | Gladney |
| 2,045,899 | A | 6/1936 | Davis |
| 2,094,316 | A | 9/1937 | Cross et al. |
| 2,133,622 | A | 10/1938 | Larmour |
| 2,193,775 | A | 3/1940 | Stratford |
| 2,193,807 | A | 3/1940 | Dieterich |
| 2,329,940 | A | 9/1943 | Ponzer |
| 2,772,739 | A | 12/1956 | Arie |

(Continued)

FOREIGN PATENT DOCUMENTS

| | | |
|---|---|---|
| CA | 2064682 | 4/1992 |
| CA | 2336077 | 1/2000 |

(Continued)

OTHER PUBLICATIONS

International Search Report for PCT/GB2011/001749 dated Apr. 5, 2012.

(Continued)

*Primary Examiner* — George Suchfield
(74) *Attorney, Agent, or Firm* — Craig W. Roddy; Tumey L.L.P.

(57) ABSTRACT

Disclosed are spacer fluids and methods of use in subterranean formations. Embodiments may include use of consolidating spacer fluids in displacement of drilling fluids from a well bore annulus.

76 Claims, 2 Drawing Sheets

(56) References Cited

U.S. PATENT DOCUMENTS

| | | | |
|---|---|---|---|
| 2,842,205 A | | 7/1958 | Allen et al. |
| 2,848,051 A | | 8/1958 | Willaims |
| 2,871,133 A | | 1/1959 | Palonen et al. |
| 2,880,096 A | | 3/1959 | Hurley |
| 2,945,769 A | | 7/1960 | Gama et al. |
| 3,066,031 A | | 11/1962 | Schifferle |
| 3,168,139 A | | 2/1965 | Kennedy et al. |
| 3,320,077 A | | 5/1967 | Prior |
| 3,411,580 A | * | 11/1968 | Roberts et al. ................ 166/285 |
| 3,454,095 A | | 7/1969 | Messenger et al. |
| 3,467,193 A | | 9/1969 | McColl et al. |
| 3,473,939 A | | 10/1969 | Mayberry |
| 3,499,491 A | | 3/1970 | Wyant et al. |
| 3,557,876 A | | 1/1971 | Tragesser |
| 3,574,816 A | | 4/1971 | Abbdellatif et al. |
| 3,748,159 A | | 7/1973 | George |
| 3,749,173 A | * | 7/1973 | Hill et al. ................ 166/291 |
| 3,863,718 A | * | 2/1975 | Bruist ................ 166/285 |
| 3,876,005 A | | 4/1975 | Fincher et al. |
| 3,887,009 A | | 6/1975 | Miller et al. |
| 3,887,385 A | | 6/1975 | Quist et al. |
| 3,959,007 A | | 5/1976 | Pitt |
| 4,018,617 A | | 4/1977 | Nicholson |
| 4,018,619 A | | 4/1977 | Webster et al. |
| 4,031,184 A | | 6/1977 | McCord |
| 4,036,301 A | | 7/1977 | Powers et al. |
| 4,101,332 A | | 7/1978 | Nicholson |
| 4,105,459 A | | 8/1978 | Mehta |
| 4,141,843 A | * | 2/1979 | Watson ................ 507/207 |
| 4,176,720 A | | 12/1979 | Wilson |
| 4,268,316 A | | 5/1981 | Wills et al. |
| 4,274,881 A | | 6/1981 | Langton |
| 4,304,300 A | * | 12/1981 | Watson ................ 166/291 |
| 4,341,562 A | | 7/1982 | Ahlbeck |
| RE31,190 E | | 3/1983 | Detroit et al. |
| 4,407,677 A | | 10/1983 | Wills et al. |
| 4,432,800 A | | 2/1984 | Kneller et al. |
| 4,435,216 A | | 3/1984 | Diehl et al. |
| 4,436,850 A | | 3/1984 | Burdick et al. |
| 4,460,292 A | | 7/1984 | Durham et al. |
| 4,470,463 A | * | 9/1984 | Holland ................ 166/293 |
| 4,494,990 A | | 1/1985 | Harris |
| 4,515,635 A | | 5/1985 | Rao et al. |
| 4,519,452 A | | 5/1985 | Tsao et al. |
| 4,555,269 A | | 11/1985 | Rao et al. |
| 4,614,599 A | | 9/1986 | Walker |
| 4,624,711 A | | 11/1986 | Styron |
| 4,633,950 A | | 1/1987 | Delhommer et al. |
| 4,676,317 A | | 6/1987 | Fry et al. |
| 4,676,832 A | | 6/1987 | Childs et al. |
| 4,741,782 A | | 5/1988 | Styron |
| 4,784,223 A | | 11/1988 | Worrall et al. |
| 4,829,107 A | | 5/1989 | Kindt |
| 4,883,125 A | | 11/1989 | Wilson et al. |
| 4,941,536 A | | 7/1990 | Brothers et al. |
| 4,992,102 A | | 2/1991 | Barbour |
| 5,030,366 A | | 7/1991 | Wilson et al. |
| 5,049,288 A | | 9/1991 | Brothers et al. |
| 5,058,679 A | | 10/1991 | Hale et al. |
| RE33,747 E | | 11/1991 | Hartley et al. |
| 5,086,850 A | | 2/1992 | Harris et al. |
| 5,113,943 A | * | 5/1992 | Wilson et al. ................ 166/291 |
| 5,121,795 A | | 6/1992 | Ewert et al. |
| 5,123,487 A | | 6/1992 | Harris et al. |
| 5,125,455 A | | 6/1992 | Harris et al. |
| 5,127,473 A | | 7/1992 | Harris et al. |
| 5,183,505 A | | 2/1993 | Spinney |
| 5,213,160 A | | 5/1993 | Nahm et al. |
| 5,215,585 A | | 6/1993 | Luthra et al. |
| 5,238,064 A | | 8/1993 | Dahl et al. |
| 5,252,128 A | | 10/1993 | Gopalkrishnan |
| 5,266,111 A | | 11/1993 | Barbour |
| 5,290,355 A | | 3/1994 | Jakel et al. |
| 5,295,543 A | | 3/1994 | Terry et al. |
| 5,305,831 A | | 4/1994 | Nahm |
| 5,314,022 A | | 5/1994 | Cowan et al. |
| 5,316,083 A | * | 5/1994 | Nahm et al. ................ 166/291 |
| 5,327,968 A | | 7/1994 | Onan et al. |
| 5,337,824 A | | 8/1994 | Cowan |
| 5,339,902 A | | 8/1994 | Harris |
| 5,346,548 A | | 9/1994 | Mehta |
| 5,352,288 A | | 10/1994 | Mallow |
| 5,358,044 A | | 10/1994 | Hale et al. |
| 5,358,049 A | | 10/1994 | Hale et al. |
| 5,361,841 A | | 11/1994 | Hale et al. |
| 5,361,842 A | | 11/1994 | Hale et al. |
| 5,368,103 A | | 11/1994 | Heathman et al. |
| 5,370,185 A | | 12/1994 | Cowan et al. |
| 5,372,641 A | | 12/1994 | Carpenter |
| 5,382,290 A | | 1/1995 | Nahm et al. |
| 5,383,521 A | | 1/1995 | Onan et al. |
| 5,383,967 A | | 1/1995 | Chase |
| 5,398,758 A | | 3/1995 | Onan et al. |
| 5,417,759 A | | 5/1995 | Huddleston |
| 5,423,379 A | | 6/1995 | Hale et al. |
| 5,430,235 A | | 7/1995 | Hooykaas et al. |
| 5,439,056 A | | 8/1995 | Cowan |
| 5,456,751 A | | 10/1995 | Zandi et al. |
| 5,458,195 A | | 10/1995 | Totten et al. |
| 5,464,060 A | | 11/1995 | Hale et al. |
| 5,472,051 A | | 12/1995 | Brothers |
| 5,476,144 A | | 12/1995 | Nahm et al. |
| 5,494,513 A | | 2/1996 | Fu et al. |
| 5,499,677 A | | 3/1996 | Cowan |
| 5,515,921 A | | 5/1996 | Cowan et al. |
| 5,518,996 A | | 5/1996 | Maroy et al. |
| 5,520,730 A | | 5/1996 | Barbour |
| 5,529,123 A | | 6/1996 | Carpenter et al. |
| 5,529,624 A | | 6/1996 | Riegler |
| 5,536,311 A | | 7/1996 | Rodrigues |
| 5,542,782 A | | 8/1996 | Carter et al. |
| 5,554,352 A | | 9/1996 | Jaques et al. |
| 5,569,324 A | | 10/1996 | Totten et al. |
| 5,580,379 A | | 12/1996 | Cowan |
| 5,585,333 A | | 12/1996 | Dahl et al. |
| 5,588,489 A | | 12/1996 | Chatterji et al. |
| 5,641,584 A | | 6/1997 | Andersen et al. |
| 5,673,753 A | | 10/1997 | Hale et al. |
| 5,681,384 A | | 10/1997 | Liskowitz |
| 5,688,844 A | | 11/1997 | Chatterji et al. |
| 5,711,383 A | | 1/1998 | Terry et al. |
| 5,716,910 A | | 2/1998 | Totten et al. |
| 5,728,654 A | | 3/1998 | Dobson et al. |
| 5,789,352 A | | 8/1998 | Carpenter |
| 5,795,924 A | | 8/1998 | Chatterji et al. |
| 5,820,670 A | | 10/1998 | Chatterji et al. |
| 5,851,960 A | | 12/1998 | Totten et al. |
| 5,866,516 A | | 2/1999 | Costin |
| 5,866,517 A | | 2/1999 | Carpenter et al. |
| 5,874,387 A | | 2/1999 | Carpenter et al. |
| 5,897,699 A | | 4/1999 | Chatterji et al. |
| 5,900,053 A | | 5/1999 | Brothers et al. |
| 5,913,364 A | | 6/1999 | Sweatman |
| 5,988,279 A | | 11/1999 | Udarbe et al. |
| 6,022,408 A | | 2/2000 | Stokes et al. |
| 6,060,434 A | | 5/2000 | Sweatman et al. |
| 6,060,535 A | | 5/2000 | Villar et al. |
| 6,063,738 A | | 5/2000 | Chatterji et al. |
| 6,098,711 A | | 8/2000 | Chatterji et al. |
| 6,138,759 A | | 10/2000 | Chatterji et al. |
| 6,143,069 A | | 11/2000 | Brothers et al. |
| 6,145,591 A | | 11/2000 | Boncan et al. |
| 6,153,562 A | | 11/2000 | Villar et al. |
| 6,167,967 B1 | | 1/2001 | Sweatman |
| 6,170,575 B1 | | 1/2001 | Reddy et al. |
| 6,230,804 B1 | | 5/2001 | Mueller et al. |
| 6,244,343 B1 | | 6/2001 | Brothers et al. |
| 6,245,142 B1 | | 6/2001 | Reddy et al. |
| 6,258,757 B1 | | 7/2001 | Sweatman et al. |
| 6,277,189 B1 | | 8/2001 | Chugh |
| 6,312,515 B1 | | 11/2001 | Barlet-Gouedard et al. |
| 6,315,042 B1 | | 11/2001 | Griffith et al. |
| 6,328,106 B1 | | 12/2001 | Griffith et al. |
| 6,332,921 B1 | | 12/2001 | Brothers et al. |

| Patent No. | Date | Inventor |
|---|---|---|
| 6,367,550 B1 | 4/2002 | Chatterji et al. |
| 6,379,456 B1 | 4/2002 | Heathman et al. |
| 6,402,833 B1 | 6/2002 | O'Hearn et al. |
| 6,409,819 B1 | 6/2002 | Ko |
| 6,416,574 B1 | 7/2002 | Steelhammer |
| 6,451,104 B2 | 9/2002 | Mehta |
| 6,457,524 B1 | 10/2002 | Roddy |
| 6,478,869 B2 | 11/2002 | Reddy et al. |
| 6,488,763 B2 | 12/2002 | Brothers et al. |
| 6,488,764 B2 | 12/2002 | Westerman |
| 6,494,951 B1 | 12/2002 | Reddy et al. |
| 6,500,252 B1 | 12/2002 | Chatterji et al. |
| 6,508,305 B1 | 1/2003 | Brannon et al. |
| 6,516,884 B1 | 2/2003 | Chatterji et al. |
| 6,524,384 B2 | 2/2003 | Griffith et al. |
| 6,547,871 B2 | 4/2003 | Chatterji et al. |
| 6,547,891 B2 | 4/2003 | Linden et al. |
| 6,555,307 B2 | 4/2003 | Maruyama |
| 6,561,273 B2 | 5/2003 | Brothers et al. |
| 6,562,122 B2 | 5/2003 | Dao et al. |
| 6,565,647 B1 | 5/2003 | Day et al. |
| 6,572,697 B2 | 6/2003 | Gleeson et al. |
| 6,610,139 B2 | 8/2003 | Reddy et al. |
| 6,626,243 B1 | 9/2003 | Go Boncan |
| 6,645,290 B1 | 11/2003 | Barbour |
| 6,656,265 B1 | 12/2003 | Garnier et al. |
| 6,660,080 B2 | 12/2003 | Reddy et al. |
| 6,666,268 B2 | 12/2003 | Griffith et al. |
| 6,668,927 B1 * | 12/2003 | Chatterji et al. ............... 166/291 |
| 6,668,929 B2 | 12/2003 | Griffith et al. |
| 6,689,208 B1 | 2/2004 | Brothers |
| 6,702,044 B2 | 3/2004 | Reddy et al. |
| 6,706,108 B2 | 3/2004 | Polston |
| 6,708,760 B1 | 3/2004 | Chatterji et al. |
| 6,715,568 B1 | 4/2004 | Bailey |
| 6,716,282 B2 | 4/2004 | Griffith et al. |
| 6,729,405 B2 | 5/2004 | DiLullo et al. |
| 6,755,905 B2 | 6/2004 | Oates |
| 6,767,398 B2 | 7/2004 | Trato |
| 6,776,237 B2 | 8/2004 | Dao et al. |
| 6,796,378 B2 | 9/2004 | Reddy et al. |
| 6,797,054 B2 | 9/2004 | Chatterji et al. |
| 6,823,940 B2 | 11/2004 | Reddy et al. |
| 6,832,652 B1 | 12/2004 | Dillenbeck et al. |
| 6,835,243 B2 | 12/2004 | Brothers et al. |
| 6,837,316 B2 | 1/2005 | Reddy et al. |
| 6,846,357 B2 | 1/2005 | Reddy et al. |
| 6,848,519 B2 | 2/2005 | Reddy et al. |
| 6,874,353 B2 | 4/2005 | Johnson |
| 6,874,578 B1 | 4/2005 | Garnier |
| 6,887,833 B2 | 5/2005 | Brothers et al. |
| 6,889,767 B2 | 5/2005 | Reddy et al. |
| 6,904,971 B2 | 6/2005 | Brothers et al. |
| 6,908,508 B2 | 6/2005 | Brothers |
| 6,911,078 B2 | 6/2005 | Barlet-Gouedard et al. |
| 7,022,755 B1 | 4/2006 | Chatterji et al. |
| 7,048,053 B2 | 5/2006 | Santra et al. |
| 7,077,203 B1 | 7/2006 | Roddy et al. |
| 7,101,829 B2 | 9/2006 | Guichard |
| 7,174,962 B1 | 2/2007 | Roddy et al. |
| 7,182,137 B2 | 2/2007 | Fyten et al. |
| 7,199,086 B1 | 4/2007 | Roddy et al. |
| 7,204,307 B2 | 4/2007 | Roddy et al. |
| 7,204,310 B1 | 4/2007 | Roddy et al. |
| 7,213,646 B2 | 5/2007 | Roddy et al. |
| 7,284,609 B2 | 10/2007 | Roddy et al. |
| 7,285,164 B2 | 10/2007 | Luke et al. |
| 7,285,166 B2 | 10/2007 | Luke et al. |
| 7,293,609 B2 | 11/2007 | Dealy |
| 7,335,252 B2 | 2/2008 | Roddy et al. |
| 7,337,842 B2 | 3/2008 | Roddy et al. |
| 7,338,923 B2 | 3/2008 | Roddy et al. |
| 7,341,104 B2 | 3/2008 | Roddy et al. |
| 7,350,573 B2 | 4/2008 | Reddy |
| 7,353,870 B2 | 4/2008 | Roddy et al. |
| 7,381,263 B2 | 6/2008 | Roddy et al. |
| 7,387,675 B2 | 6/2008 | Roddy et al. |
| 7,395,860 B2 | 7/2008 | Roddy et al. |
| 7,404,855 B2 | 7/2008 | Chatterji et al. |
| 7,409,990 B1 | 8/2008 | Burts et al. |
| 7,445,669 B2 | 11/2008 | Roddy et al. |
| 7,478,675 B2 | 1/2009 | Roddy et al. |
| 7,607,482 B2 | 10/2009 | Roddy et al. |
| 7,607,484 B2 | 10/2009 | Roddy et al. |
| 7,627,870 B1 | 12/2009 | Michaeli et al. |
| 7,631,692 B2 | 12/2009 | Roddy et al. |
| 7,674,332 B2 | 3/2010 | Roddy et al. |
| 7,708,071 B2 | 5/2010 | Roddy et al. |
| 7,743,828 B2 | 6/2010 | Roddy et al. |
| 7,784,542 B2 | 8/2010 | Roddy et al. |
| 7,789,150 B2 | 9/2010 | Roddy et al. |
| 7,867,954 B2 | 1/2011 | Warrender et al. |
| 7,927,419 B2 | 4/2011 | Roddy |
| 8,030,253 B2 | 10/2011 | Roddy et al. |
| 8,039,253 B2 | 10/2011 | Asou |
| 8,261,827 B2 | 9/2012 | Roddy |
| 8,281,859 B2 | 10/2012 | Roddy |
| 8,297,357 B2 | 10/2012 | Brenneis |
| 8,307,899 B2 | 11/2012 | Brenneis |
| 8,318,642 B2 | 11/2012 | Roddy |
| 8,327,939 B2 | 12/2012 | Roddy |
| 8,333,240 B2 | 12/2012 | Roddy |
| 8,399,387 B2 | 3/2013 | Roddy |
| 8,434,553 B2 | 5/2013 | Brenneis |
| 8,440,596 B2 | 5/2013 | Brenneis et al. |
| 2002/0033121 A1 | 3/2002 | Marko |
| 2002/0073897 A1 | 6/2002 | Trato |
| 2002/0117090 A1 | 8/2002 | Ku |
| 2003/0116065 A1 | 6/2003 | Griffith et al. |
| 2003/0116887 A1 | 6/2003 | Scott |
| 2003/0167970 A1 | 9/2003 | Polston |
| 2003/0168215 A1 | 9/2003 | Drochon |
| 2003/0234103 A1 | 12/2003 | Lee et al. |
| 2004/0007162 A1 | 1/2004 | Morioka et al. |
| 2004/0040475 A1 | 3/2004 | De La Roij et al. |
| 2004/0079260 A1 | 4/2004 | Datta et al. |
| 2004/0107877 A1 | 6/2004 | Getzlaf et al. |
| 2004/0108113 A1 | 6/2004 | Luke et al. |
| 2004/0112600 A1 | 6/2004 | Luke et al. |
| 2004/0129181 A1 | 7/2004 | Lalande et al. |
| 2004/0182577 A1 * | 9/2004 | Chatterji et al. ........... 166/305.1 |
| 2004/0187740 A1 | 9/2004 | Timmons |
| 2004/0188091 A1 | 9/2004 | Luke et al. |
| 2004/0191439 A1 | 9/2004 | Bour et al. |
| 2004/0211562 A1 | 10/2004 | Brothers et al. |
| 2004/0211564 A1 | 10/2004 | Brothers et al. |
| 2004/0244650 A1 | 12/2004 | Brothers |
| 2004/0244977 A1 | 12/2004 | Luke et al. |
| 2004/0256102 A1 | 12/2004 | Trato |
| 2004/0262000 A1 | 12/2004 | Morgan et al. |
| 2005/0000734 A1 | 1/2005 | Getzlaf et al. |
| 2005/0034867 A1 | 2/2005 | Griffith et al. |
| 2005/0056191 A1 | 3/2005 | Brothers et al. |
| 2005/0061505 A1 | 3/2005 | Caveny et al. |
| 2005/0072599 A1 | 4/2005 | Luke et al. |
| 2005/0077045 A1 | 4/2005 | Chatterji et al. |
| 2005/0084334 A1 | 4/2005 | Shi et al. |
| 2005/0098317 A1 | 5/2005 | Reddy et al. |
| 2005/0133221 A1 | 6/2005 | Chatterji et al. |
| 2006/0025312 A1 | 2/2006 | Santra et al. |
| 2006/0054319 A1 | 3/2006 | Fyten |
| 2006/0065399 A1 | 3/2006 | Luke et al. |
| 2006/0081372 A1 | 4/2006 | Dealy et al. |
| 2006/0166834 A1 | 7/2006 | Roddy |
| 2006/0175060 A1 | 8/2006 | Reddy |
| 2006/0260512 A1 | 11/2006 | Nordmeyer |
| 2007/0056475 A1 | 3/2007 | Roddy et al. |
| 2007/0056479 A1 | 3/2007 | Gray |
| 2007/0102157 A1 | 5/2007 | Roddy et al. |
| 2007/0137528 A1 | 6/2007 | LeRoy-Delage et al. |
| 2007/0186820 A1 | 8/2007 | O'Hearn |
| 2007/0289744 A1 | 12/2007 | Bingamon |
| 2008/0092780 A1 | 4/2008 | Bingamon et al. |
| 2008/0156491 A1 | 7/2008 | Roddy et al. |
| 2008/0229979 A1 | 9/2008 | Lewis |
| 2008/0300149 A1 | 12/2008 | Reddy et al. |
| 2009/0044726 A1 | 2/2009 | Brouillette et al. |
| 2009/0124522 A1 | 5/2009 | Roddy et al. |

| | | | |
|---|---|---|---|
| 2009/0200029 | A1 | 8/2009 | Roddy et al. |
| 2009/0266543 | A1 | 10/2009 | Reddy et al. |
| 2009/0312445 | A1 | 12/2009 | Roddy et al. |
| 2009/0320720 | A1 | 12/2009 | Roddy et al. |
| 2010/0025039 | A1 | 2/2010 | Roddy et al. |
| 2010/0041792 | A1 | 2/2010 | Roddy et al. |
| 2010/0044043 | A1 | 2/2010 | Roddy et al. |
| 2010/0044057 | A1 | 2/2010 | Dealy et al. |
| 2010/0081584 | A1 | 4/2010 | Perez |
| 2010/0122816 | A1 | 5/2010 | Lewis |
| 2010/0273912 | A1 | 10/2010 | Roddy et al. |
| 2010/0292365 | A1 | 11/2010 | Roddy et al. |
| 2010/0294496 | A1 | 11/2010 | Woytowich et al. |
| 2011/0000400 | A1 | 1/2011 | Roddy |
| 2011/0017452 | A1 | 1/2011 | Benkley |
| 2011/0100626 | A1 | 5/2011 | Brenneis et al. |
| 2011/0297378 | A1 | 12/2011 | Reddy et al. |
| 2012/0152539 | A1 | 6/2012 | Karcher |
| 2012/0227631 | A1 | 9/2012 | Roddy |
| 2012/0267107 | A1 | 10/2012 | Benkley |
| 2012/0285682 | A1 | 11/2012 | Santra et al. |
| 2012/0291674 | A1 | 11/2012 | Brenneis |
| 2012/0318506 | A1 | 12/2012 | Benkley |
| 2012/0325119 | A1 | 12/2012 | Brenneis |
| 2012/0325476 | A1 | 12/2012 | Brenneis |
| 2012/0325477 | A1 | 12/2012 | Brenneis |
| 2012/0328377 | A1 | 12/2012 | Brenneis |
| 2013/0008352 | A1 | 1/2013 | Roddy |
| 2013/0048286 | A1 | 2/2013 | Morgan et al. |
| 2013/0061779 | A1 | 3/2013 | Brenneis et al. |

FOREIGN PATENT DOCUMENTS

| | | |
|---|---|---|
| CA | 2153372 | 1/2006 |
| CN | 1165849 | 11/1997 |
| CN | 1182062 | 5/1998 |
| EP | 0814067 | 12/1997 |
| EP | 1092693 | 4/2001 |
| EP | 1236701 | 9/2002 |
| EP | 1394137 | 7/2003 |
| EP | 1348831 | 10/2003 |
| EP | 1900703 | 3/2008 |
| EP | 2075303 | 7/2009 |
| GB | 1469954 | 4/1997 |
| GB | 2455446 | 6/2009 |
| JP | 52117316 | 10/1977 |
| JP | 10110487 | 4/1998 |
| RU | 2026959 | 1/1995 |
| RU | 2003136028 | 5/2005 |
| SU | 1373781 | 2/1988 |
| WO | WO 83/01443 | 4/1983 |
| WO | 97/21637 | 6/1997 |
| WO | WO 98/54108 | 12/1998 |
| WO | WO 00/63134 | 1/2000 |
| WO | WO 03/031364 | 4/2003 |
| WO | WO 2004/101951 | 11/2004 |
| WO | WO 2004/101952 | 11/2004 |
| WO | WO 2005/047212 | 5/2005 |
| WO | WO 2005/061846 | 7/2005 |
| WO | WO 2006/032841 | 3/2006 |
| WO | WO 2007/028952 | 3/2007 |
| WO | WO 2007/041841 | 4/2007 |
| WO | WO 2007/048999 | 5/2007 |
| WO | WO 2007/128945 | 11/2007 |
| WO | WO 2009/138747 | 11/2009 |

OTHER PUBLICATIONS

International Search Report and Written Opinion for PCT/GB2010/000712 dated Jul. 26, 2010.
Office Action for U.S. Appl. No. 13/620,013 dated Feb. 26, 2013.
Office Action for U.S. Appl. No. 13/560,406 dated Oct. 17, 2012.
U.S. Appl. No. 13/477,777, filed May 22, 2012, Roddy.
U.S. Appl. No. 13/479,476, filed May 24, 2012, Roddy.
U.S. Appl. No. 13/560,406, filed Jul. 27, 2012, Brenneis et al.
Herndon, "Setting Downhole Plugs: A State-of-the-Art", Petroleum Engineer International, Apr. 1978.
Sersale, "Portland-Zeolite-Cement for Minimizing Alkali-Aggregate Expansion", 1987.
Smith, "Cementing" Society of Professional Engineers, pp. 14, 38, 1987.
Smith, "Cementing" Society of Petroleum Engineers, p. 38, 1990.
Nelson, "Well Cementing", 1990.
Sugama, "Carbonation of Hydrothermally Treated Phosphate-Bonded Calcium Aluminate Cements", pp. 1-9 (undated but admitted as prior art), 1992.
Vinson, "Acid Removable Cement System Helps Lost Circulation in Productive Zones", IADC/SPE 23929, Feb. 1992.
Marfil, "Zeolite Crystallization in Portland Cement Concrete Due to Alkali-Aggregate Reaction", 1993.
Atkins, "Zeolite P in Cements", "Its Potential for Immobilizing Toxic and Radioactive Waste Species", 1995.
Janotka, "The Properties of Mortar Using Blends With Portland Cement Clinker, Zeolite Tuff and Gypsum", 1995.
"Manufacture of supplementary cementitious materials from cement kiln dust", Mishulovich et al., World Cement Research and Development, p. 116-120, Mar. 1996.
Sugama, "Hot Alkali Carbonation of Sodium Metaphosphate Modified Fly Ash/Calcium Aluminate Blend Hydrothermal Cements", pp. 1661-1672, Sep. 11, 1996.
Rogers, "Designing a Remedial Acid Treatment for Gulf of Mexico Deepwater Turbidite Sands Containing Zeolite Cement", 1996.
Janotka, "Effect of Bentonite and Zeolite on Durability of Cement Suspension Under Sulfate Attack", 1998.
Naigian, "Study on the Suppression Effect of Natural Zeolite on Expansion of Concrete Due to Alkali-Aggregate Reaction", 1998.
Chan, Comparative Study of the Initial Surface Absorption and Chloride Diffusion of High Performance Zeolite Silica Fume and PFA concretes, 1999.
Poon, "A Study of the Hydration of Natural Zeolite Blended Cement Pastes", 1999.
Ding, "Extreme Vertices Design of Concrete With Combined Mineral Admixtures", 1999.
Feng, "Zeolite Ceramiste Cellular Concrete", 2000.
Bartlet-Gouedard, "A Non-Conventional Way of Developing Cement Slurry for Geothermal Wells", 2001.
TXI Material Safety Data Sheet for Pressur-Seal, Oct. 2003.
"Kiln Dusts", Apr. 14, 2005.
"Beneficial use of Solid Waste in Maine", Apr. 14, 2005.
"Standards for the Management of Cement Kiln Dust Waste", Apr. 14, 2005.
"Use of Cement Kiln Dust for the Stabilization of Soils", R. L. Parsons, et al., Apr. 14, 2005.
"Alkali-activated binders by use of industrial by-products", Buchwald et al., Cement and concrete Research 35, p. 968-973, 2005.
Answer 3 of 24 Chemical Abstracts on STN "Effect of cement kiln dust substitution on chemical and physical properties and compressive strength of Portland and slag cements", Adb El-aleem et al. (abstract only), 2007.
Adaska and Taubert, "Beneficial Uses of Cement Kiln Dust", 2008 IEEE/PCA 50th Cement Industry Technical Conference, Miami, FL, pp. 1-19, May 19, 2008.
"Fly Ash Resource Center-Pozzolan," available at http://www.rmajko.com/pozzolan.htm, Apr. 20, 2009.
Suyan, "An Innovative Material for Severe Lost Circulation Control in Depleted Formations" SPE/IADC 125693, Oct. 2009.
Morgan, R.G., Suter, D.A., and Sweat, V.A., "Mathematical Analysis of a Simple Back Extrusion Rheometer," ASAE Paper No. 79/6001.
HES Brochure "SCR-100 Cement Retarder A Valuable Time Saver", 1994.
HES Brochure "Halad-344 Fluid Loss Additive", 1998.
HES Brochure "HR-5 Cement Additive", 1998.
HES Brochure "AQF-2 Foaming Agent", 1999.
HES Brochure "ThermaLock™ Cement for Corrosive $CO_2$ Environments", 1999.
HES Brochure "Halad-413 Fluid Loss Additive", 1999.
HES Brochure "Howco Suds Surfactant", 1999.
HES Brochure "HR-12 Cement Retarder", 1999.
HES Brochure "HR-15 Cement Retarder", 1999.
HES Brochure "HR-25 Cement Retarder", 1999.
HES Brochure "HR-4 Cement Retarder", 1999.
HES Brochure "HR-7 Cement Retarder", 1999.

HES Brochure "Pozmix A Cement Additive", 1999.
HES Brochure "Pozmix Cement and Pozmix 140", 1999.
HES Brochure "SCR-100 Cement Retarder", 1999.
HES Brochure "SCR-500L High Temp Retarder", 2000.
HES Brochure "Halad-23 Fluid Loss Additive", 2000.
HES Brochure "Thermatek Service", May 2005.
HES Brochure "Tuned Spacer™ III", Apr. 2007.
HES Brochure "Econolite™ Additive for Cement Slurries", Aug. 2007.
HES Brochure "SSA-1™ Strength-Stabilizing Agent", Aug. 2007.
HES Brochure "SSA-2™ Coarse Silica Flour", Aug. 2007.
BASF Technical Bulletin "MetaMax® PA", Aug. 2007.
HES Brochure "Silicalite™", Aug. 2007.
HES Brochure "SCR-100™ Cement Retarder", Aug. 2007.
HESS Pumice Products Inc., Fact Sheet for "DS-200", "DS-325", and "Ultrafine Grout", Aug. 2007.
HES Brochure "Cal-Seal 60™ Cement Accelerator", Aug. 2007.
HES Brochure "WG-17 LXP™ Free-Water Control Agent", Dec. 2007.
HES Brochure "HR®-601 Cement Retarder", Jan. 2008.
HES Brochure "Thermatek® RSP Rapid Set Plug Service", Mar. 2008.
HES Product Data Sheet "Baroid®", Mar. 25, 2010.
HES Brochure "Enhancer 923™ Cement Agent" (undated but admitted as prior art), Jun. 2010.
HES Brochure "Enhancer 923™ Agent—Successes from the Field", Jun. 2010.
HES Brochure "Latex 3000™ Cement Additive", Jun. 2010.
HES Brochure "Foamer 760™ Foamer/Stabilizer", Aug. 2010.
Hes Brochure Tuned® Spacer IV, Aug. 2010.
HES Brochure "Tuned® Spacer V", Dec. 2010.
HES Brochure "D-Air 5000™ Defoamer", Aug. 2011.
HES Brochure "SA-1015™ Suspending Agent", Mar. 2012.
HES Brochure "WellLife® III Cementing Service", Jan. 2012.
Office Action from U.S. Appl. No. 11/223,671, Dec. 15, 2005.
Office Action from U.S. Appl. No. 11/271,431, Mar. 6, 2006.
Office Action from U.S. Appl. No. 11/223,671, Mar. 31, 2006.
Office Action from U.S. Appl. No. 11/271,431, May 17, 2006.
Office Action from U.S. Appl. No. 11/271,431 (Advisory Action), Jul. 11, 2006.
Office Action from U.S. Appl. No. 11/416,563, Jul. 21, 2006.
Office Action from U.S. Appl. No. 11/403,032, Jul. 24, 2006.
Office Action from U.S. Appl. No. 11/271,431, Aug. 15, 2006.
Office Action from U.S. Appl. No. 11/440,627, Aug. 21, 2006.
Office Action from U.S. Appl. No. 11/402,741, Oct. 19, 2006.
Office Action from U.S. Appl. No. 11/484,951, Oct. 26, 2006.
Office Action from U.S. Appl. No. 11/484,951, Dec. 21, 2006.
Office Action from U.S. Appl. No. 11/223,703, Jan. 17, 2007.
Office Action from U.S. Appl. No. 11/402,741, Feb. 2, 2007.
Office Action from U.S. Appl. No. 11/223,485, Feb. 28, 2007.
Office Action from U.S. Appl. No. 11/223,669, Feb. 28, 2007.
Office Action from U.S. Appl. No. 11/271,690, Mar. 13, 2007.
Office Action from U.S. Appl. No. 11/402,741, Mar. 22, 2007.
Office Action from U.S. Appl. No. 11/223,703, Apr. 25, 2007.
Office Action from U.S. Appl. No. 11/402,741, May 29, 2007.
Office Action from U.S. Appl. No. 11/223,669, Jun. 18, 2007.
Office Action from U.S. Appl. No. 11/257,261, Aug. 10, 2007.
Office Action from U.S. Appl. No. 11/402,741, Sep. 6, 2007.
Office Action from U.S. Appl. No. 11/223,669, Oct. 9, 2007.
Office Action from U.S. Appl. No. 11/223,750, Oct. 16, 2007.
Office Action from U.S. Appl. No. 11/402,741, Oct. 24, 2007.
Office Action from U.S. Appl. No. 11/223,669, Jan. 29, 2008.
Office Action from U.S. Appl. No. 11/223,669, Apr. 8, 2008.
Office Action from U.S. Appl. No. 12/263,800, May 1, 2009.
Office Action from U.S. Appl. No. 12/283,398, Jul. 15, 2009.
Office Action from U.S. Appl. No. 12/263,800, Jul. 28, 2009.
Office Action from U.S. Appl. No. 12/420,630, Aug. 3, 2009.
Office Action from U.S. Appl. No. 12/349,676, Nov. 4, 2009.
Office Action from U.S. Appl. No. 12/606,381, Mar. 23, 2010.
Office Action from U.S. Appl. No. 12/609,993, Apr. 9, 2010.
Office Action from U.S. Appl. No. 12/609,993, Jun. 15, 2010.
Office Action from U.S. Appl. No. 12/558,097, Jun. 30, 2010.
Notice of Allowance from USPTO U.S. Appl. No. 12/609,993, Jul. 26, 2010.
Office Action from U.S. Appl. No. 12/588,097, Sep. 3, 2010.
Office Action from U.S. Appl. No. 12/844,612, Oct. 1, 2010.
Office Action from U.S. Appl. No. 12/833,189, Oct. 1, 2010.
Office Action from U.S. Appl. No. 12/844,612, Jan. 28, 2011.
Notice of Allowance for U.S. Appl. No. 12/544,915, Aug. 11, 2011.
Office Action from U.S. Appl. No. 12/844,612, Sep. 6, 2011.
Final Office Action from U.S. Appl. No. 12/264,010, Apr. 10, 2012.
Office Action from U.S. Appl. No. 12/844,612, Apr. 11, 2012.
Office Action from U.S. Appl. No. 13/399,913, May 15, 2012.
Office Action for U.S. Appl. No. 13/477,777, May 22, 2012.
Office Action from U.S. Appl. No. 13/447,560, May 31, 2012.
Office Action from U.S. Appl. No. 12/821,412, Jun. 5, 2012.
Office Action from U.S. Appl. No. 13/825,004, Jun. 14, 2012.
Office Action from U.S. Appl. No. 13/447,560, Jun. 21, 2012.
Office Action from U.S. Appl. No. 13/479,476, Jul. 2, 2012.
Office Action from U.S. Appl. No. 12/975,196, Jul. 3, 2012.
Office Action from U.S. Appl. No. 12/844,612, Jul. 30, 2012.
Notice of Allowance from U.S. Appl. No. 13/399,913, Aug. 23, 2012.
Notice of Allowance from U.S. Appl. No. 13/535,258, Sep. 7, 2012.
U.S. Appl. No. 13/620,163, filed Sep. 14, 2012.
U.S. Appl. No. 13/620,013, filed Sep. 14, 2012.
U.S. Appl. No. 13/622,821, filed Sep. 19, 2012.
Notice of Allowance from U.S. Appl. No. 13/825,004, Sep. 20, 2012.
Office Action from U.S. Appl. No. 13/477,777, Oct. 15, 2012.
Notice of Allowance from U.S. Appl. No. 13/844,612, Oct. 18, 2012.
Office Action for U.S. Appl. No. 13/555,624, Oct. 19, 2012.
Final Office Action from U.S. Appl. No. 12/975,196, Oct. 23, 2012.
U.S. Appl. No. 13/662,111, filed Oct. 26, 2012.
U.S. Appl. No. 13/669,149, filed Nov. 5, 2012.
Office Action for U.S. Appl. No. 13/431,701, Nov. 9, 2012.
Office Action from USPTO for U.S. Appl. No. 13/620,163, Nov. 9, 2012.
Office Action from USPTO for U.S. Appl. No. 13/606,098, Dec. 13, 2012.
Office Action from USPTO for U.S. Appl. No. 13/669,149, Dec. 19, 2012.
Foreign Search Report from PCT/GB2005/001415, Sep. 9, 2005.
Foreign Search Report from PCT/GB2006/000406, Jul. 5, 2006.
Foreign Search Report from PCT/GB2006/003163, Oct. 27, 2006.
Foreign Search Report from PCT/GB2006/003160, Nov. 2, 2006.
Foreign Search Report from PCT/GB2006/003735, Dec. 1, 2006.
Foreign Search Report from PCT/GB2006/003694, Dec. 19, 2006.
Foreign Search Report from PCT/GB2006/000401, May 8, 2007.
Foreign Search Report from PCT/GB2009/000295, Feb. 3, 2009.
English language translation of USSR Patent No. RU 2026959, Jan. 20, 1995.
English language translation of Foreign Office Action for Application No. RU2008113765, Jul. 6, 2009.
English language translation of Foreign Office Action for Chinese Application No. 200680042014.3, Dec. 1, 2010.
EPO Application No. 06794648.3 Examination Report, Apr. 17, 2009.
EPO Application No. 06779194.7 Examination Report, May 29, 2009.
PCT International Search Report and Written Opinion for International Application No. PCT/GB2009/000295, Jul. 30, 2009.
PCT International Search Report and Written Opinion for International Application No. PCT/GB2009/002597, Feb. 1, 2010.
PCT International Search Report and Written Opinion for International Application No. PCT/GB2009/002598, Feb. 11, 2010.
PCT International Preliminary Report on Patentability for International Application No. PCT/GB2009/000295, Aug. 24, 2010.
PCT International Search Report and Written Opinion for International Application No. PCT/GB2010/001986, Jan. 19, 2011.
PCT International Search Report and Written Opinion for International Application No. PCT/GB2010/002011, Feb. 4, 2011.
PCT International Preliminary Report on Patentability for International Application No. PCT/GB2009/002018, Mar. 24, 2011.
PCT International Search Report and Written Opinion for International Application No. PCT/GB2011/000933, Sep. 22, 2011.

PCT International Search Report and Written Opinion for International Application No. PCT/GB2011/001411, Jan. 27, 2012.
PCT International Search Report and Written Opinion for International Application No. PCT/US2012/046117, Oct. 26, 2012.
International Search Report and Written Opinion for PCT/US2012/046117, Oct. 26, 2012.
Foreign Office Action for Canadian Patent Application No. 2621835, Oct. 2, 2009.
Foreign Office Action for Canadian Patent Application No. 2621832, Oct. 5, 2009.
Foreign Office Action for Canadian Application No. 2650630, Oct. 14, 2010.
Foreign Office Action for CN Application No. 200680042004.X, May 12, 2010.
Foreign Office Action for EP Application No. 06 779 199.6, Mar. 1, 2010.
Foreign Office Action for EP Application No. 06 779 191.3, Mar. 31, 2010.
Foreign Office Action for EP Application No. 06 779 194.7, Jul. 2, 2010.
Foreign Office Action for EP Application No. 06 794 646.7, Sep. 24, 2010.
Foreign Office Action for EP Application No. 09 713 469.6, Sep. 28, 2010.
Foreign Office Action for RU Application No. 2008113766, Jul. 14, 2009.
Foreign Office Action for RU Application No. 2008113766, Apr. 8, 2010.
Foreign Office Action for Canadian Application No. 2658155, Nov. 16, 2010.
U.S. Appl. No. 13/767,710, filed Feb. 14, 2013.
U.S. Appl. No. 13/851,391, filed Mar. 27, 2013.
U.S. Appl. No. 13/851,475, filed Mar. 27, 2013.
U.S. Appl. No. 13/851,925, filed Mar. 27, 2013.
U.S. Appl. No. 13/872,063, filed Apr. 23, 2013.
U.S. Appl. No. 13/889,398, filed May 8, 2013.
USPTO Notice of Allowability from U.S. Appl. No. 13/669,149, dated May 7, 2013.
USPTO Notice of Allowability from U.S. Appl. No. 13/535,145, dated May 17, 2013.
USPTO Notice of Allowability from U.S. Appl. No. 12/895,436, dated May 17, 2013.
USPTO Notice of Allowability from U.S. Appl. No. 13/560,406, dated May 20, 2013.
USPTO Office Action from U.S. Appl. No. 13/620,013, dated May 28, 2013.
USPTO Final Office Action from U.S. Appl. No. 13/477,777, dated May 29, 2013.
USPTO Office Action from U.S. Appl. No. 13/851,925, dated Jun. 6, 2013.

\* cited by examiner

CONSOLIDATING SPACER FLUIDS AND METHODS OF USE

CROSS-REFERENCE TO RELATED APPLICATIONS

This application is a continuation-in-part of U.S. application Ser. No. 13/535,145, entitled "Foamed Spacer Fluids Containing Cement Kiln Dust and Methods of Use," filed on Jun. 27, 2012, which is a continuation-in-part of U.S. application Ser. No. 12/895,436, entitled "Spacer Fluids Containing Cement Kiln Dust and Methods of Use," filed on Sep. 30, 2010, which is a continuation-in-part of U.S. application Ser. No. 12/264,010, now U.S. Pat. No. 8,333,240, entitled "Reduced Carbon Footprint Sealing Compositions for Use in Subterranean Formations," filed on Nov. 3, 2008, which is a continuation-in-part of U.S. application Ser. No. 11/223,669, now U.S. Pat. No. 7,445,669, entitled "Settable Compositions Comprising Cement Kiln Dust and Additive(s)," filed Sep. 9, 2005, the entire disclosures of which are incorporated herein by reference.

BACKGROUND

The present invention relates to spacer fluids for use in subterranean operations and, more particularly, in certain embodiments, to consolidating spacer fluids and methods of use in subterranean formations.

Spacer fluids are often used in subterranean operations to facilitate improved displacement efficiency when introducing new fluids into a well bore. For example, a spacer fluid can be used to displace a fluid in a well bore before introduction of another fluid. When used for drilling fluid displacement, spacer fluids can enhance solids removal as well as separate the drilling fluid from a physically incompatible fluid. For instance, in primary cementing operations, the spacer fluid may be placed into the well bore to separate the cement composition from the drilling fluid. Spacer fluids may also be placed between different drilling fluids during drilling change outs or between a drilling fluid and completion brine. Spacer fluids typically do not consolidate in that the spacer fluids typically do not develop significant gel or compressive strength.

To be effective, the spacer fluid can have certain characteristics. For example, the spacer fluid may be compatible with the displaced fluid and the cement composition. This compatibility may also be present at downhole temperatures and pressures. In some instances, it is also desirable for the spacer fluid to leave surfaces in the well bore water wet, thus facilitating bonding with the cement composition. Rheology of the spacer fluid can also be important. A number of different rheological properties may be important in the design of a spacer fluid, including yield point, plastic viscosity, gel strength, and shear stress, among others. While rheology can be important in spacer fluid design, conventional spacer fluids may not have the desired rheology at downhole temperatures. For instance, conventional spacer fluids may experience undesired thermal thinning at elevated temperatures. As a result, conventional spacer fluids may not provide the desired displacement in some instances.

SUMMARY

The present invention relates to spacer fluids for use in subterranean operations and, more particularly, in certain embodiments, to consolidating spacer fluids and methods of use in subterranean formations.

An embodiment may comprise displacing a drilling fluid disposed in a well bore annulus, comprising: designing a spacer fluid to meet at least one property under predetermined well bore conditions, wherein the property is selected from the group consisting of: (i) a yield point of from about 25 Pascals to about 250 Pascals, (ii) a static gel strength of from about 70 lbf/100 ft$^2$ to about 500 lbf/100 ft$^2$, (iii) a yield limit in compression from about 1 psi to about 2,000 psi, and (iv) an unconfined uniaxial compressive strength of from about 5 psi to about 10,000 psi; using the spacer fluid to displace at least a portion of the drilling fluid from the well bore annulus; and allowing at least a portion of the spacer fluid to consolidate in the well bore, and wherein the portion of the spacer fluid consolidates in the well bore to meet the property.

Another embodiment may comprise a method of displacing a drilling fluid disposed in a well bore annulus, comprising: using a consolidating spacer fluid to displace at least a portion of the drilling fluid from the well bore annulus; and allowing at least a portion of the consolidating spacer fluid to consolidate in the well bore annulus, wherein the portion of the consolidating spacer fluid has a zero gel time of about 4 hours or less.

Another embodiment may comprise a method of displacing a drilling fluid disposed in a well bore annulus, comprising: using a consolidating spacer fluid to displace at least a portion of the drilling fluid from the well bore annulus; and allowing at least a portion of the consolidating spacer fluid to consolidate in the well bore annulus, wherein the portion of the consolidating spacer fluid has a transition time of about 45 minutes or less.

Another embodiment may comprise a method of displacing a drilling fluid disposed in a well bore annulus, comprising: introducing a consolidating spacer fluid into the well bore annulus to displace at least a portion of the drilling fluid from the well bore annulus; and allowing at least a portion of the consolidating spacer fluid to consolidate in the well bore annulus; wherein the consolidating spacer fluid comprises water and at least one additive selected from the group consisting of kiln dust, gypsum, fly ash, bentonite, hydroxyethyl cellulose, sodium silicate, a hollow microsphere, gilsonite, perlite, a gas, an organic polymer, a biopolymer, latex, ground rubber, a surfactant, crystalline silica, amorphous silica, silica flour, fumed silica, nano-clay, salt, fiber, hydratable clay, rice husk ash, micro-fine cement, metakaolin, zeolite, shale, pumicite, Portland cement, Portland cement interground with pumice, barite, slag, lime, and any combination thereof; and wherein the portion of the consolidating spacer fluid has a zero gel time of about 8 hours or less.

Another embodiment may comprise a method of displacing a drilling fluid disposed in a well bore annulus, comprising: introducing a consolidating spacer fluid into the well bore annulus to displace at least a portion of the drilling fluid from the well bore annulus; allowing at least a portion of the consolidating spacer fluid to consolidate in the well bore annulus; and measuring consolidation properties of the portion of the consolidating spacer fluid in the well bore annulus.

Another embodiment of a method of may comprise a method of evaluating a spacer fluid for use in separating a drilling fluid and a cement composition in a well bore comprising: providing the spacer fluid; and measuring a transition time of the spacer fluid.

Another embodiment may comprise a method of evaluating a spacer fluid for use in separating a drilling fluid and a cement composition in a well bore comprising: providing the spacer fluid; and measuring a zero gel time of the spacer fluid.

Another embodiment may comprise a consolidating spacer fluid that separates a drilling fluid and a cement composition in a well bore, comprising: water; and at least one additive selected from the group consisting of kiln dust, gypsum, fly ash, bentonite, hydroxyethyl cellulose, sodium silicate, a hollow microsphere, gilsonite, perlite, a gas, an organic polymer, a biopolymer, latex, ground rubber, a surfactant, crystalline silica, amorphous silica, silica flour, fumed silica, nano-clay, salt, fiber, hydratable clay, rice husk ash, micro-fine cement, metakaolin, zeolite, shale, pumicite, Portland cement, Portland cement interground with pumice, barite, slag, lime, and any combination thereof; and wherein the portion of the consolidating spacer fluid has a zero gel time of about 4 hours or less.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
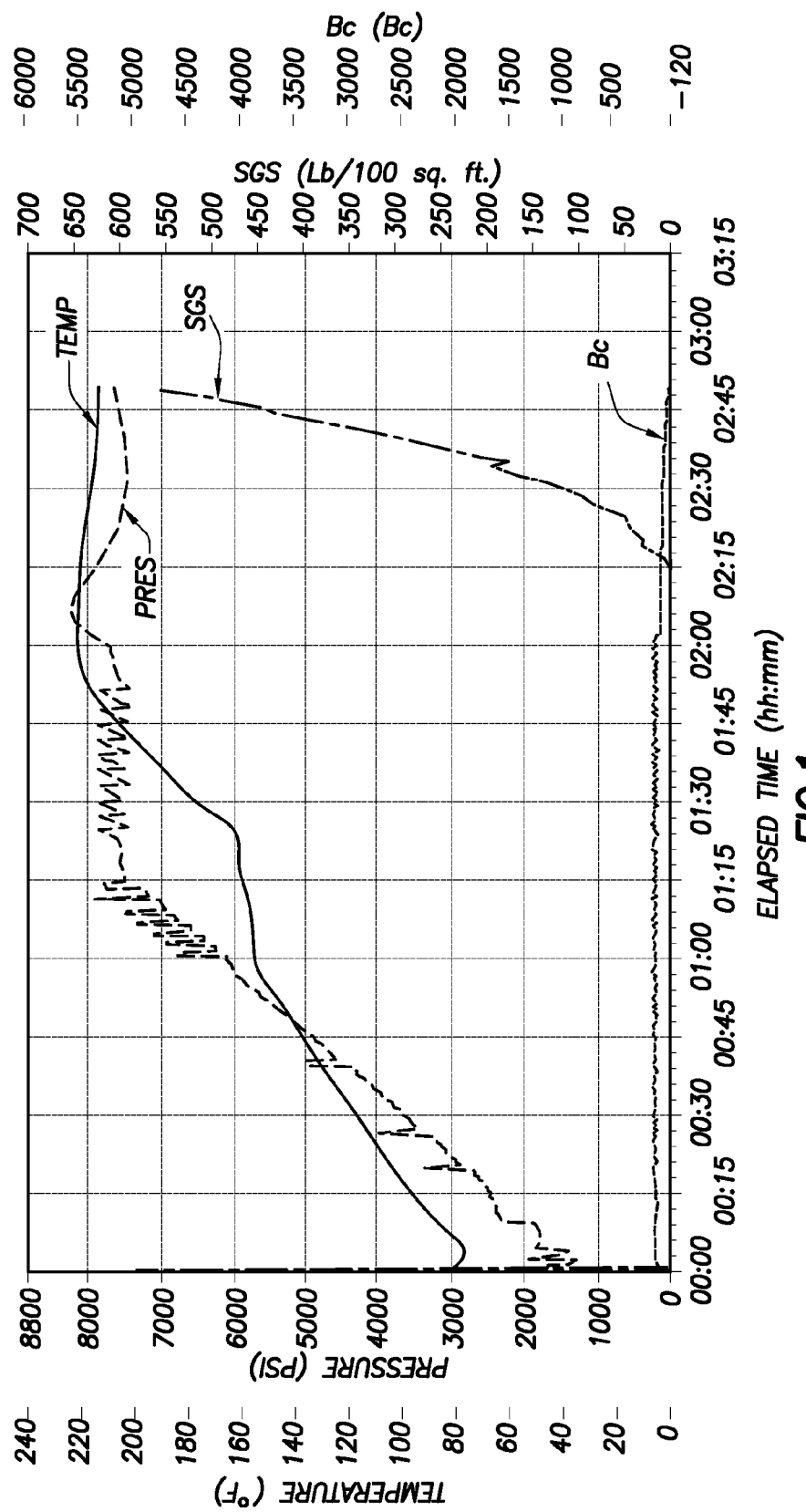
FIG. 1 is a graph showing measured static gel strength values at various temperature and pressure readings as a factor of time for an example consolidating spacer fluid.

The present invention relates to spacer fluids for use in subterranean operations and, more particularly, in certain embodiments, to spacer fluids that comprise cement kiln dust ("CKD") and methods that use CKD for enhancing one or more rheological properties of a spacer fluid. In accordance with present embodiments, the spacer fluids may improve the efficiency of well bore cleaning and well bore fluid removal. Embodiments of the spacer fluids may be foamed. Embodiments of the spacer fluids may be consolidating. For example, the spacer fluids may develop gel strength and/or compressive strength when left in a well bore.

There may be several potential advantages to the methods and compositions of the present invention, only some of which may be alluded to herein. One of the many potential advantages of the methods and compositions of the present invention is that the CKD may be used in spacer fluids as a rheology modifier allowing formulation of a spacer fluid with desirable rheological properties. Another potential advantage of the methods and compositions of the present invention is that inclusion of the CKD in the spacer fluids may result in a spacer fluid without undesired thermal thinning. Yet another potential advantage of the present invention is that spacer fluids comprising CKD may be more economical than conventional spacer fluids, which are commonly prepared with higher cost additives. Yet another potential advantage of the present invention is that foamed spacer fluids comprising CKD may be used for displacement of lightweight drilling fluids. Yet another potential advantage is that the consolidating spacer fluids may possess additional physical characteristics that can provide additional benefits to the well bore operations. For example, the consolidating spacer fluids may develop gel and/or compressive strength in a well bore annulus. Accordingly, the consolidating spacer fluid left in the well bore may function to provide a substantially impermeable barrier to seal off formation fluids and gases and consequently serve to mitigate potential fluid migration. The consolidating spacer fluid in the well bore annulus may also protect the pipe string or other conduit from corrosion. Consolidating spacer fluids may also serve to protect the erosion of the cement sheath formed by subsequently introduced cement compositions.

Embodiments of the spacer fluids of the present invention may comprise water and CKD. In some embodiments, the spacer fluids may consolidate when left in a well bore. For example, the spacer fluid may set and harden by reaction of the CKD in the water. In some embodiments, the spacer fluids may be foamed. For example, the foamed spacer fluids may comprise water, CKD, a foaming agent, and a gas. A foamed spacer fluid may be used, for example, where it is desired for the spacer fluid to be lightweight. In accordance with present embodiments, the spacer fluid may be used to displace a first fluid from a well bore with the spacer fluid having a higher yield point than the first fluid. For example, the spacer fluid may be used to displace at least a portion of a drilling fluid from the well bore. Other optional additives may also be included in embodiments of the spacer fluids as desired for a particular application. For example, the spacer fluids may further comprise viscosifying agents, organic polymers, dispersants, surfactants, weighting agents, and any combination thereof.

The spacer fluids generally should have a density suitable for a particular application as desired by those of ordinary skill in the art, with the benefit of this disclosure. In some embodiments, the spacer fluids may have a density in the range of from about 4 pounds per gallon ("ppg") to about 24 ppg. In other embodiments, the spacer fluids may have a density in the range of about 4 ppg to about 17 ppg. In yet other embodiments, the spacer fluids may have a density in the range of about 8 ppg to about 13 ppg. Embodiments of the spacer fluids may be foamed or unfoamed or comprise other means to reduce their densities known in the art, such as lightweight additives. Those of ordinary skill in the art, with the benefit of this disclosure, will recognize the appropriate density for a particular application.

The water used in an embodiment of the spacer fluids may include, for example, freshwater, saltwater (e.g., water containing one or more salts dissolved therein), brine (e.g., saturated saltwater produced from subterranean formations), seawater, or any combination thereof. Generally, the water may be from any source, provided that the water does not contain an excess of compounds that may undesirably affect other components in the spacer fluid. The water is included in an amount sufficient to form a pumpable spacer fluid. In some embodiments, the water may be included in the spacer fluids in an amount in the range of from about 15% to about 95% by weight of the spacer fluid. In other embodiments, the water may be included in the spacer fluids of the present invention in an amount in the range of from about 25% to about 85% by weight of the spacer fluid. One of ordinary skill in the art, with the benefit of this disclosure, will recognize the appropriate amount of water to include for a chosen application.

The CKD may be included in embodiments of the spacer fluids as a rheology modifier. Among other things, using CKD in embodiments of the present invention can provide spacer fluids having rheology suitable for a particular application. Desirable rheology may be advantageous to provide a spacer fluid that is effective for drilling fluid displacement, for example. In some instances, the CKD can be used to provide a spacer fluid with a low degree of thermal thinning. For example, the spacer fluid may even have a yield point that increases at elevated temperatures, such as those encountered downhole.

CKD is a material generated during the manufacture of cement that is commonly referred to as cement kiln dust. The term "CKD" is used herein to mean cement kiln dust as described herein and equivalent forms of cement kiln dust made in other ways. The term "CKD" typically refers to a partially calcined kiln feed which can be removed from the gas stream and collected, for example, in a dust collector during the manufacture of cement. Usually, large quantities of CKD are collected in the production of cement that are commonly disposed of as waste. Disposal of the waste CKD can add undesirable costs to the manufacture of the cement, as well as the environmental concerns associated with its disposal. Because the CKD is commonly disposed as a waste material, spacer fluids prepared with CKD may be more economical than conventional spacer fluids, which are commonly prepared with higher cost additives. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$.

The CKD may be included in the spacer fluids in an amount sufficient to provide, for example, the desired rheological properties. In some embodiments, the CKD may be present in the spacer fluids in an amount in the range of from about 1% to about 65% by weight of the spacer fluid (e.g., about 1%, about 5%, about 10%, about 15%, about 20%, about 25%, about 30%, about 35%, about 40%, about 45%, about 50%, about 55%, about 60%, about 65%, etc.). In some embodiments, the CKD may be present in the spacer fluids in an amount in the range of from about 5% to about 60% by weight of the spacer fluid. In some embodiments, the CKD may be present in an amount in the range of from about 20% to about 35% by weight of the spacer fluid. Alternatively, the amount of CKD may be expressed by weight of dry solids. As used herein, the term "by weight dry solids" refers to the amount of a component, such as CKD, relative to the overall amount of dry solids used in preparation of the spacer fluid. For example, the CKD may be present in an amount in a range of from about 1% to 100% by weight of dry solids (e.g., about 1%, about 5%, about 10%, about 20%, about 30%, about 40%, about 50%, about 60%, about 70%, about 80%, about 90%, 100%, etc.). In some embodiments, the CKD may be present in an amount in the range of from about 50% to 100% and, alternatively, from about 80% to 100% by weight of dry solids. One of ordinary skill in the art, with the benefit of this disclosure, will recognize the appropriate amount of CKD to include for a chosen application.

While the preceding description describes CKD, the present invention is broad enough to encompass the use of other partially calcined kiln feeds. For example, embodiments of the spacer fluids may comprise lime kiln dust, which is a material that is generated during the manufacture of lime. The term lime kiln dust typically refers to a partially calcined kiln feed which can be removed from the gas stream and collected, for example, in a dust collector during the manufacture of lime. The chemical analysis of lime kiln dust from various lime manufacturers varies depending on a number of factors, including the particular limestone or dolomitic limestone feed, the type of kiln, the mode of operation of the kiln, the efficiencies of the lime production operation, and the associated dust collection systems. Lime kiln dust generally may comprise varying amounts of free lime and free magnesium, lime stone, and/or dolomitic limestone and a variety of oxides, such as $SiO_2$, $Al_2O_3$, $Fe_2O_3$, CaO, MgO, $SO_3$, $Na_2O$, and $K_2O$, and other components, such as chlorides.

Optionally, embodiments of the spacer fluids may further comprise fly ash. A variety of fly ashes may be suitable, including fly ash classified as Class C or Class F fly ash according to American Petroleum Institute, API Specification for Materials and Testing for Well Cements, API Specification 10, Fifth Ed., Jul. 1, 1990. Suitable examples of fly ash include, but are not limited to, POZMIX® A cement additive, commercially available from Halliburton Energy Services, Inc., Duncan, Okla. Where used, the fly ash generally may be included in the spacer fluids in an amount desired for a particular application. In some embodiments, the fly ash may be present in the spacer fluids in an amount in the range of from about 1% to about 60% by weight of the spacer fluid (e.g., about 5%, about 10%, about 15%, about 20%, about 25%, about 30%, about 35%, about 40%, about 45%, about 50%, about 55%, etc.). In some embodiments, the fly ash may be present in the spacer fluids in an amount in the range of from about 1% to about 35% by weight of the spacer fluid. In some embodiments, the fly ash may be present in the spacer fluids in an amount in the range of from about 1% to about 10% by weight of the spacer fluid. Alternatively, the amount of fly ash may be expressed by weight of dry solids. For example, the fly ash may be present in an amount in a range of from about 1% to about 99% by weight of dry solids (e.g., about 1%, about 5%, about 10%, about 20%, about 30%, about 40%, about 50%, about 60%, about 70%, about 80%, about 90%, about 99%, etc.). In some embodiments, the fly ash may be present in an amount in the range of from about 1% to about 20% and, alternatively, from about 1% to about 10% by weight of dry solids. One of ordinary skill in the art, with the benefit of this disclosure, will recognize the appropriate amount of the fly ash to include for a chosen application.

Optionally, embodiments of the spacer fluids may further comprise barite. In some embodiments, the barite may be sized barite. Sized barite generally refers to barite that has been separated, sieved, ground, or otherwise sized to produce barite having a desired particle size. For example, the barite may be sized to produce barite having a particle size less than about 200 microns in size. Where used, the barite generally may be included in the spacer fluids in an amount desired for a particular application. In some embodiments, the barite may be present in the spacer fluids in an amount in the range of from about 1% to about 60% by weight of the consolidating spacer fluid (e.g., about 5%, about 10%, about 15%, about 20%, about 25%, about 30%, about 35%, about 40%, about 45%, about 50%, about 55%, etc.). In some embodiments, the barite may be present in the spacer fluids in an amount in the range of from about 1% to about 35% by weight of the spacer fluid. In some embodiments, the barite may be present in the spacer fluids in an amount in the range of from about 1% to about 10% by weight of the spacer fluid. Alternatively, the amount of barite may be expressed by weight of dry solids. For example, the barite may be present in an amount in a range of from about 1% to about 99% by weight of dry solids (e.g., about 1%, about 5%, about 10%, about 20%, about 30%, about 40%, about 50%, about 60%, about 70%, about 80%, about 90%, about 99%, etc.). In some embodiments, the barite may be present in an amount in the range of from about 1% to about 20% and, alternatively, from about 1% to about 10% by weight of dry solids. One of ordinary skill in the art, with the benefit of this disclosure, will recognize the appropriate amount of the barite to include for a chosen application.

Optionally, embodiments of the spacer fluids may further comprise pumicite. Where used, the pumicite generally may be included in the spacer fluids in an amount desired for a particular application. In some embodiments, the pumicite may be present in the spacer fluids in an amount in the range of from about 1% to about 60% by weight of the spacer fluid (e.g., about 5%, about 10%, about 15%, about 20%, about 25%, about 30%, about 35%, about 40%, about 45%, about 50%, about 55%, etc.). In some embodiments, the pumicite may be present in the spacer fluids in an amount in the range of from about 1% to about 35% by weight of the spacer fluid. In some embodiments, the pumicite may be present in the spacer fluids in an amount in the range of from about 1% to about 10% by weight of the spacer fluid. Alternatively, the amount of pumicite may be expressed by weight of dry solids. For example, the pumicite may be present in an amount in a range of from about 1% to about 99% by weight of dry solids (e.g., about 1%, about 5%, about 10%, about 20%, about 30%, about 40%, about 50%, about 60%, about 70%, about 80%, about 90%, about 99%, etc.). In some embodiments, the pumicite may be present in an amount in the range of from about 1% to about 20% and, alternatively, from about 1% to about 10% by weight of dry solids. One of ordinary skill in the art, with the benefit of this disclosure, will recognize the appropriate amount of the pumicite to include for a chosen application.

Optionally, embodiments of the spacer fluids may further comprise a free water control additive. As used herein, the term "free water control additive" refers to an additive included in a liquid for, among other things, reducing (or preventing) the presence of free water in the liquid. Free water control additive may also reduce (or prevent) the settling of solids. Examples of suitable free water control additives include, but are not limited to, bentonite, amorphous silica, hydroxyethyl cellulose, and combinations thereof. An example of a suitable free water control additive is SA-1015™ suspending agent, available from Halliburton Energy Services, Inc. Another example of a suitable free water control additive is WG17™ solid additive, available from Halliburton Energy Services, Inc. The free water control additive may be provided as a dry solid in some embodiments. Where used, the free water control additive may be present in an amount in the range of from about 0.1% to about 16% by weight of dry solids, for example. In alternative embodiments, the free water control additive may be present in an amount in the range of from about 0.1% to about 2% by weight of dry solids.

In some embodiments, the spacer fluids may further comprise a lightweight additive. The lightweight additive may be included to reduce the density of embodiments of the spacer fluids. For example, the lightweight additive may be used to form a lightweight spacer fluid, for example, having a density of less than about 13 ppg. The lightweight additive typically may have a specific gravity of less than about 2.0. Examples of suitable lightweight additives may include sodium silicate, hollow microspheres, gilsonite, perlite, and combinations thereof. An example of a suitable sodium silicate is ECONO-LITE™ additive, available from Halliburton Energy Services, Inc. Where used, the lightweight additive may be present in an amount in the range of from about 0.1% to about 20% by weight of dry solids, for example. In alternative embodiments, the lightweight additive may be present in an amount in the range of from about 1% to about 10% by weight of dry solids.

As previously mentioned, embodiments of the spacer fluids may be foamed with a gas, for example, to provide a spacer fluid with a reduced density. It should be understood that reduced densities may be needed for embodiments of the spacer fluids to more approximately match the density of a particular drilling fluid, for example, where lightweight drilling fluids are being used. A drilling fluid may be considered lightweight if it has a density of less than about 13 ppg, alternatively, less than about 10 ppg, and alternatively less than about 9 ppg. In some embodiments, the spacer fluids may be foamed to have a density within about 10% of the density of the drilling fluid and, alternatively, within about 5% of the density of the drilling fluid. While techniques, such as lightweight additives, may be used to reduce the density of the spacer fluids comprising CKD without foaming, these techniques may have drawbacks. For example, reduction of the spacer fluid's density to below about 13 ppg using lightweight additives may produce unstable slurries, which can have problems with settling of solids, floating of lightweight additives, and free water, among others. Accordingly, the spacer fluid may be foamed to provide a spacer fluid having a reduced density that is more stable.

Therefore, in some embodiments, the spacer fluids may be foamed and comprise water, CKD, a foaming agent, and a gas. Optionally, to provide a spacer fluid with a lower density and more stable foam, the foamed spacer fluid may further comprise a lightweight additive, for example. With the lightweight additive, a base slurry may be prepared that may then be foamed to provide an even lower density. In some embodiments, the foamed spacer fluid may have a density in the range of from about 4 ppg to about 13 ppg and, alternatively, about 7 ppg to about 9 ppg. In one particular embodiment, a base slurry may be foamed from a density of in the range of from about 9 ppg to about 13 ppg to a lower density, for example, in a range of from about 7 ppg to about 9 ppg.

The gas used in embodiments of the foamed spacer fluids may be any suitable gas for foaming the spacer fluid, including, but not limited to air, nitrogen, and combinations thereof. Generally, the gas should be present in embodiments of the foamed spacer fluids in an amount sufficient to form the desired foam. In certain embodiments, the gas may be present in an amount in the range of from about 5% to about 80% by volume of the foamed spacer fluid at atmospheric pressure, alternatively, about 5% to about 55% by volume, and, alternatively, about 15% to about 30% by volume.

Where foamed, embodiments of the spacer fluids may comprise a foaming agent for providing a suitable foam. As used herein, the term "foaming agent" refers to a material or combination of materials that facilitate the formation of a foam in a liquid. Any suitable foaming agent for forming a foam in an aqueous liquid may be used in embodiments of the spacer fluids. Examples of suitable foaming agents may include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming agent is FOAMER™ 760 foamer/stabilizer, available from Halliburton Energy Services, Inc. Suitable foaming agents are described in U.S. Pat. Nos. 6,797,054, 6,547,871, 6,367,550, 6,063,738, and 5,897,699, the entire disclosures of which are incorporated herein by reference.

Generally, the foaming agent may be present in embodiments of the foamed spacer fluids in an amount sufficient to provide a suitable foam. In some embodiments, the foaming agent may be present in an amount in the range of from about 0.8% to about 5% by volume of the water ("bvow").

A wide variety of additional additives may be included in the spacer fluids as deemed appropriate by one skilled in the art, with the benefit of this disclosure. Examples of such additives include, but are not limited to: supplementary cementitious materials, weighting agents, viscosifying agents (e.g., clays, hydratable polymers, guar gum), fluid loss control additives, lost circulation materials, filtration control additives, dispersants, defoamers, corrosion inhibitors, scale inhibitors, formation conditioning agents, and a water-wetting surfactants. Water-wetting surfactants may be used to aid in removal of oil from surfaces in the well bore (e.g., the casing) to enhance cement and consolidating spacer fluid bonding. Examples of suitable weighting agents include, for example, materials having a specific gravity of 3 or greater, such as barite. Specific examples of these, and other, additives include: organic polymers, biopolymers, latex, ground rubber, surfactants, crystalline silica, amorphous silica, silica flour, fumed silica, nano-clays (e.g., clays having at least one dimension less than 100 nm), salts, fibers, hydratable clays, microspheres, rice husk ash, micro-fine cement (e.g., cement having an average particle size of from about 5 microns to about 10 microns), metakaolin, zeolite, shale, Portland cement, Portland cement interground with pumice, perlite, barite, slag, lime (e.g., hydrated lime), gypsum, and any combinations thereof, and the like. In some embodiments, a supplementary cementitious material may be included in the spacer fluid in addition to or in place of all or a portion of the CKD. Examples of suitable supplementary cementitious materials include, without limitation, Portland cement, Portland cement interground with pumice, micro-fine cement, fly ash, slag, pumicite, gypsum and any combination thereof. A person having ordinary skill in the art, with the benefit of this disclosure, will readily be able to determine the type and amount of additive useful for a particular application and desired result.

As previously mentioned, embodiments of the spacer fluids may be consolidating in that the spacer fluids may develop gel strength and/or compressive strength in the well bore. Consolidation is defined herein as one of three types of material behavior: Type 1 consolidation is identifiable as a gelled fluid that can be moved and/or pumped when the hydraulic shear stress exceeds the yield point (YP) of the gel. Type 2 consolidation is identifiable as a plastic semi-solid that can experience "plastic deformation" if the shear stress, compressive stress, or tensile stress exceeds the "plastic yield limit." Type 3 consolidation is identifiable as a rigid solid similar to regular set cement. During a steady progressive strain rate during conventional compressive testing, both confined and unconfined, a Type 3 consolidated material would exhibit linear elastic Hookean stress-strain behavior, followed by some plastic yield and/or mechanical failure. This novel consolidating spacer fluid may transform from the pumpable fluid that was placed during the normal displacement operation to Type 1 and/or further progress to Type 2 and/or further progress to Type 3. It should be understood that the consolidation of the spacer fluid is at well bore conditions and, as will be appreciated by those of ordinary skill in the art, well bore conditions may vary. However, embodiments of the spacer fluids may be characterized by exhibiting Type 1, Type 2, or Type 3 consolidation under specific well bore conditions.

Specific examples of how to characterize a Type 1 consolidation include measuring the yield stress. Type 1 consolidation exhibits a YP from about 25 Pascals to about 250 Pascals, where YP is measured by one of the methods described in U.S. Pat. No. 6,874,353, namely: using a series of parallel vertical blades on a rotor shaft, referred to by those skilled in the art as the "Vane Method"; or using the new device and method also described in U.S. Pat. No. 6,874,353. Another method used to define the YP of Type 1 consolidation is defined in Morgan, R. G., Suter, D. A., and Sweat, V. A., *Mathematical Analysis of a Simple Back Extrusion Rheometer*, ASAE Paper No. 79-6001. Additionally, other methods commonly known to those skilled in the art may be used to define the YP of Type 1 consolidated spacer fluids. Alternatively, another method of characterizing a Type 1 consolidation includes measuring the gelled strength of the material, which may be defined as "Static Gel Strength" (SGS) as is defined and measured in accordance with the API Recommended Practice on *Determining the Static Gel Strength of Cement Formations*, ANSI/API Recommended Practice 10B-6. A Type 1 consolidation may exhibit SGS values from about 70 lbf/100 ft$^2$ up to about 500 lbf/100 ft$^2$.

Specific examples of how to characterize a Type 2 consolidation include measuring the yield limit in compression (YL-C). The YL-C is simply the uniaxial compressive stress at which the material experiences a permanent deformation. Permanent deformation refers to a measurable deformation strain that does not return to zero over a period of time that is on the same order of magnitude as the total time required to conduct the measurement. YL-C may range from 1 psi (lbf/sq. in.) to 2,000 psi, with the most common values ranging from 5 psi to 500 psi.

Specific examples of how to characterize a Type 3 consolidation include measuring the compressive strength. Type 3 consolidation will exhibit unconfined uniaxial compressive strengths ranging from about 5 psi to about 10,000 psi, while the most common values will range from about 10 psi to about 2,500 psi. These values are achieved in 7 days or less. Some formulations may be designed so as to provide significant compressive strengths with 24 hours to 48 hours. Typical sample geometry and sizes for measurement are similar to, but not limited to, those used for characterizing oil well cements: 2 inch cubes; or 2 inch diameter cylinders that are 4 inches in length; or 1 inch diameter cylinders that are 2 inches in length; and other methods known to those skilled in the art of measuring "mechanical properties" of oil well cements. For example, the compressive strength may be determined by crushing the samples in a compression-testing machine. The compressive strength is calculated from the failure load divided by the cross-sectional area resisting the load and is reported in units of pound-force per square inch (psi). Compressive strengths may be determined in accordance with API RP 10B-2, Recommended Practice for Testing Well Cements, First Edition, July 2005.

As a specific example of a consolidation, when left in a well bore annulus (e.g., between a subterranean formation and the pipe string disposed in the subterranean formation or between the pipe string and a larger conduit disposed in the subterranean formation), the spacer fluid may consolidate to develop static gel strength and/or compressive strength. The consolidated mass formed in the well bore annulus may act to support and position the pipe string in the well bore and bond the exterior surface of the pipe string to the walls of the well bore or to the larger conduit. The consolidated mass formed in the well bore annulus may also provide a substantially impermeable barrier to seal off formation fluids and gases and consequently also serve to mitigate potential fluid migration. The consolidated mass formed in the well bore annulus may also protect the pipe string or other conduit from corrosion.

Embodiments of the spacer fluids of the present invention may have a transition time that is shorter than the transition time of cement compositions subsequently introduced into the well bore. The term "transition time," as used herein, refers to the time for a fluid to progress from a static gel strength of about 100 lbf/100 ft² to about 500 lbf/100 ft². By having a shorter transition time, the consolidating spacer fluid can reduce or even prevent migration of gas in the well bore, even if gas migrates through a subsequently introduced cement composition before it has developed sufficient gel strength to prevent such migration. Gas and liquid migration can typically be prevented at a static gel strength of 500 lbf/100 ft². By reducing the amount of gas that can migrate through the well bore, the subsequently added cement compositions can progress through its slower transition period without gas migration being as significant factor as the cement develops static gel strength. Some embodiments of the consolidating spacer fluids may have a transition time (i.e., the time to progress from a static gel strength of about 100 lbf/100 ft² to about 500 lbf/100 ft²) at well bore conditions of about 45 minutes or less, about 30 minutes or less, about 20 minutes or less, or about 10 minutes or less. Embodiments of the consolidating spacer fluids also quickly develop static gel strengths of about 100 lbf/100 ft² and about 500 lbf/100 ft², respectively, at well bore conditions. The time for a fluid to a develop a static gel strength of about 100 lbf/100 ft² is also referred to as the "zero gel time." For example, the consolidating spacer fluids may have a zero gel time at well bore condition of about 8 hours or less, and, alternatively, about 4 hours or less. In some embodiments, the consolidating spacer fluids may have a zero gel time in a range of from about 0 minutes to about 4 hours or longer. By way of further example, the consolidating spacer fluids may develop static gel strengths of about 500 lbf/100 ft² or more at well bore conditions in a time of from about 10 minutes to about 8 hours or longer. The preceding time for development of static gel strengths are listed as being at well bore conditions. Those of ordinary skill in the art will understand that particular well bore conditions (e.g., temperature, pressure, depth, etc.) will vary; however, embodiments of the spacer should meet these specific requirements at well bore conditions. Static gel strength may be measured in accordance with API Recommended Practice on *Determining the Static Gel Strength of Cement Formations*, ANSI/API Recommended Practice 10B-6.

Embodiments of the spacer fluids of the present invention may be prepared in accordance with any suitable technique. In some embodiments, the desired quantity of water may be introduced into a mixer (e.g., a cement blender) followed by the dry blend. The dry blend may comprise the CKD and additional solid additives, for example. Additional liquid additives, if any, may be added to the water as desired prior to, or after, combination with the dry blend. This mixture may be agitated for a sufficient period of time to form a base slurry. This base slurry may then be introduced into the well bore via pumps, for example. In the foamed embodiments, the base slurry may be pumped into the well bore, and a foaming agent may be metered into the base slurry followed by injection of a gas, e.g., at a foam mixing "T," in an amount sufficient to foam the base slurry thereby forming a foamed spacer fluid, in accordance with embodiments of the present invention. After foaming, the foamed spacer fluid may be introduced into a well bore. As will be appreciated by those of ordinary skill in the art, with the benefit of this disclosure, other suitable techniques for preparing spacer fluids may be used in accordance with embodiments of the present invention.

An example method of the present invention includes a method for evaluating a spacer fluid. The example method may comprise providing the spacer fluid for use in separating a drilling fluid and a cement composition in a well bore. Properties of the spacer fluid may then be measured to determine, for example, the consolidation efficiency for the particular fluid. In some embodiments, the transition time and/or zero gel time of the spacer fluid may be measured. As previously described, the transition time is the time for the fluid to progress from a static gel strength of about 100 lbf/100 ft² to about 500 lbf/100 ft², and the zero gel time is the time for the fluid to develop a static gel strength of about 100 lbf/100 ft². Static gel strength may be measured in accordance with API Recommended Practice on *Determining the Static Gel Strength of Cement Formations*, ANSI/API Recommended Practice 10B-6. In some embodiments, the compressive strength may be measured, which may be the unconfined uniaxial compressive strength. Techniques for testing of compressive strength testing are described in more detail above. These measurements may be performed at a range of conditions, for example, to simulate well bore conditions. In some embodiments, the transition time may be measured at a temperature of from about 40° F. to about 300° F. and a pressure of from about 2,000 psi to about 10,000 psi. The compressive strengths may be determined, for example, at atmospheric conditions after the spacer fluid has been allowed to set in a water bath at temperatures of from about 40° F. to 300° F. for a time of from about 24 hours to about 7 days. In some embodiments, the preceding evaluation may be performed for a set of sample spacer fluids, wherein embodiments further comprises selecting one of the sample spacer fluids from the set based on the measured properties. Embodiments may further comprise preparing a spacer fluid based on the selected spacer fluid and using the prepared spacer fluid in displacement of a drilling fluid from a well bore annulus.

An example method of the present invention includes a method of enhancing rheological properties of a spacer fluid. The method may comprise including CKD in a spacer fluid. The CKD may be included in the spacer fluid in an amount sufficient to provide a higher yield point than a first fluid. The higher yield point may be desirable, for example, to effectively displace the first fluid from the well bore. As used herein, the term "yield point" refers to the resistance of a fluid to initial flow, or representing the stress required to start fluid movement. In an embodiment, the yield point of the spacer fluid at a temperature of up to about 180° F. is greater than about 5 lb/100 ft². In an embodiment, the yield point of the spacer fluid at a temperature of up to about 180° F. is greater than about 10 lb/100 ft². In an embodiment, the yield point of the spacer fluid at a temperature of up to about 180° F. is greater than about 20 lb/100 ft². It may be desirable for the spacer fluid to not thermally thin to a yield point below the first fluid at elevated temperatures. Accordingly, the spacer fluid may have a higher yield point than the first fluid at elevated temperatures, such as 180° F. or bottom hole static temperature ("BHST"). In one embodiment, the spacer fluid may have a yield point that increases at elevated temperatures. For example, the spacer fluid may have a yield point that is higher at 180° F. than at 80° F. By way of further example, the spacer fluid may have a yield point that is higher at BHST than at 80° F.

Another example method of the present invention includes a method of displacing a first fluid from a well bore, the well bore penetrating a subterranean formation. The method may comprise providing a spacer fluid that comprises CKD and water. The method may further comprise introducing the spacer fluid into the well bore to displace at least a portion of the first fluid from the well bore. In some embodiments, the spacer fluid may displace the first fluid from a well bore annulus, such as the annulus between a pipe string and the subterranean formation or between the pipe string and a larger conduit. In some embodiments, the spacer fluid may be characterized by having a higher yield point than the first fluid at 80° F. In some embodiments, the spacer fluid may be characterized by having a higher yield point than the first fluid at 130° F. In some embodiments, the spacer fluid may be characterized by having a higher yield point than the first fluid at 180° F.

In an embodiment, the first fluid displaced by the spacer fluid comprises a drilling fluid. By way of example, the spacer fluid may be used to displace the drilling fluid from the well bore. In addition to displacement of the drilling fluid from the well bore, the spacer fluid may also remove the drilling fluid from the walls of the well bore. The drilling fluid may include, for example, any number of fluids, such as solid suspensions, mixtures, and emulsions. In some embodiments, the drilling fluid may comprise an oil-based drilling fluid. An example of a suitable oil-based drilling fluid comprises an invert emulsion. In some embodiments, the oil-based drilling fluid may comprise an oleaginous fluid. Examples of suitable oleaginous fluids that may be included in the oil-based drilling fluids include, but are not limited to, α-olefins, internal olefins, alkanes, aromatic solvents, cycloalkanes, liquefied petroleum gas, kerosene, diesel oils, crude oils, gas oils, fuel oils, paraffin oils, mineral oils, low-toxicity mineral oils, olefins, esters, amides, synthetic oils (e.g., polyolefins), polydiorganosiloxanes, siloxanes, organosiloxanes, ethers, acetals, dialkylcarbonates, hydrocarbons, and combinations thereof. Additional steps in embodiments of the method may comprise introducing a pipe string into the well bore, introducing a cement composition into the well bore with the spacer fluid separating the cement composition and the first fluid. In an embodiment, the cement composition may be allowed to set in the well bore. The cement composition may include, for example, cement and water.

Another example method of the present invention includes a method of separating fluids in a well bore, the well bore penetrating a subterranean formation. The method may comprise introducing a spacer fluid into the well bore, the well bore having a first fluid disposed therein. The spacer fluid may comprise, for example, CKD and water. The method may further comprise introducing a second fluid into the well bore with the spacer fluid separating the first fluid and the second fluid. In an embodiment, the first fluid comprises a drilling fluid and the second fluid comprises a cement composition. By way of example, the spacer fluid may prevent the cement composition from contacting the drilling fluid. The cement composition may be foamed or unfoamed as desired for a particular application. In an embodiment, the cement composition comprises cement kiln dust, water, and optionally a hydraulic cementitious material. A variety of hydraulic cements may be utilized in accordance with the present invention, including, but not limited to, those comprising calcium, aluminum, silicon, oxygen, iron, and/or sulfur, which set and harden by reaction with water. Suitable hydraulic cements include, but are not limited to, Portland cements, pozzolana cements, gypsum cements, high alumina content cements, slag cements, silica cements, and combinations thereof. In certain embodiments, the hydraulic cement may comprise a Portland cement. In some embodiments, the Portland cements that are suited for use in the present invention are classified as Classes A, C, H, and G cements according to American Petroleum Institute, API Specification for Materials and Testing for Well Cements, API Specification 10, Fifth Ed., Jul. 1, 1990. The spacer fluid may also remove the drilling fluid, dehydrated/gelled drilling fluid, and/or filter cake solids from the well bore in advance of the cement composition. Embodiments of the spacer fluid may improve the efficiency of the removal of these and other compositions from the well bore. Removal of these compositions from the well bore may enhance bonding of the cement composition to surfaces in the well bore. In an additional embodiment, at least a portion of used and/or unused CKD containing spacer fluid are included in the cement composition that is placed into the well and allowed to set.

In some embodiments, at least a portion of the spacer fluid may be left in the well bore such that the spacer fluid consolidates in the well bore. In some embodiments, the spacer fluid may consolidate to form an annular sheath of a rigid solid. The annular sheath of may bond the exterior surface of the pipe string to the walls of the well bore or to the larger conduit. An example method of the present invention may further include measuring the consolidation of the spacer fluid. This measurement may also include a measurement of the integrity of the bond formed between the consolidated spacer fluid and the exterior wall of the pipe string and/or between the consolidated spacer fluid and the formation or larger conduit disposed in the well bore. In some embodiments, data may be collected corresponding to the integrity of this bond, and the data may be recorded on a log, commonly referred to as a "bond long." The bond log may be used to, for example, analyze the consolidation properties of the spacer fluid in the well bore. Accordingly, embodiments may include running a cement bond log on at least the portion of the well bore containing the consolidated spacer fluid. The cement bond log for the settable spacer fluid may be obtained by any method used to measure cement integrity without limitation. In some embodiments, a tool may be run into the well bore on a wireline that can detect the bond of the set spacer fluid to the pipe string and/or the formation (or larger conduit). An example of a suitable tool includes a sonic tool.

To facilitate a better understanding of the present invention, the following examples of certain aspects of some embodiments are given. In no way should the following examples be read to limit, or define, the scope of the invention. In the following examples, concentrations are given in weight percent of the overall composition.

Example 1

Sample spacer fluids were prepared to evaluate the rheological properties of spacer fluids containing CKD. The sample spacer fluids were prepared as follows. First, all dry components (e.g., CKD, fly ash, bentonite, FWCA, etc.) were weighed into a glass container having a clean lid and agitated by hand until blended. Tap water was then weighed into a Waring blender jar. The dry components were then mixed into the water with 4,000 rpm stirring. The blender speed was then increased to 12,000 rpm for about 35 seconds.

Sample Spacer Fluid No. 1 was an 11 pound per gallon slurry that comprised 60.62% water, 34.17% CKD, 4.63% fly ash, and 0.58% free water control additive (WG-17™ solid additive).

Sample Spacer Fluid No. 2 was an 11 pound per gallon slurry that comprised 60.79% water, 30.42% CKD, 4.13% fly ash, 0.17% free water control additive (WG-17™ solid additive), 3.45% bentonite, and 1.04% Econolite™ additive.

Rheological values were then determined using a Fann Model 35 Viscometer. Dial readings were recorded at speeds of 3, 6, 100, 200, and 300 with a B1 bob, an R1 rotor, and a 1.0 spring. The dial readings, plastic viscosity, and yield points for the spacer fluids were measured in accordance with API Recommended Practices 10B, Bingham plastic model and are set forth in the table below. The abbreviation "PV" refers to plastic viscosity, while the abbreviation "YP" refers to yield point.

TABLE 1

| Sample Fluid | Temp. (° F.) | Viscometer RPM | | | | | PV (cP) | YP (lb/100 ft²) |
|---|---|---|---|---|---|---|---|---|
| | | 300 | 200 | 100 | 6 | 3 | | |
| 1 | 80 | 145 | 127 | 90 | 24 | 14 | 113.3 | 27.4 |
| | 180 | 168 | 143 | 105 | 26 | 15 | 154.5 | 30.3 |
| 2 | 80 | 65 | 53 | 43 | 27 | 22 | 41.1 | 26.9 |
| | 180 | 70 | 61 | 55 | 22 | 18 | 51.6 | 25.8 |

The thickening time of the Sample Spacer Fluid No. 1 was also determined in accordance with API Recommended Practice 10B at 205° F. Sample Spacer Fluid No. 1 had a thickening time of more than 6:00+ hours.

Accordingly, the above example illustrates that the addition of CKD to a spacer fluid may provide suitable properties for use in subterranean applications. In particular, the above example illustrates, inter alia, that CKD may be used to provide a spacer fluid that may not exhibit thermal thinning with the spacer fluid potentially even having a yield point that increases with temperature. For example, Sample Spacer Fluid No. 2 had a higher yield point at 180° F. than at 80° F. In addition, the yield point of Sample Spacer Fluid No. 1 had only a slight decrease at 180° F. as compared to 80° F. Even further, the example illustrates that addition of CKD to a spacer fluid may provide a plastic viscosity that increases with temperature.

Example 2

Additional sample spacer fluids were prepared to further evaluate the rheological properties of spacer fluids containing CKD. The sample spacer fluids were prepared as follows. First, all dry components (e.g., CKD, fly ash) were weighed into a glass container having a clean lid and agitated by hand until blended. Tap water was then weighed into a Waring blender jar. The dry components were then mixed into the water with 4,000 rpm stirring. The blender speed was then increased to 12,000 rpm for about 35 seconds.

Sample Fluid No. 3 was a 12.5 pound per gallon fluid that comprised 47.29% water and 52.71% CKD.

Sample Fluid No. 4 was a 12.5 pound per gallon fluid that comprised 46.47% water, 40.15% CKD, and 13.38% fly ash.

Sample Fluid No. 5 was a 12.5 pound per gallon fluid that comprised 45.62% water, 27.19% CKD, and 27.19% fly ash.

Sample Fluid No. 6 was a 12.5 pound per gallon fluid that comprised 44.75% water, 13.81% CKD, and 41.44% fly ash.

Sample Fluid No. 7 (comparative) was a 12.5 pound per gallon fluid that comprised 43.85% water, and 56.15% fly ash.

Rheological values were then determined using a Fann Model 35 Viscometer. Dial readings were recorded at speeds of 3, 6, 30, 60, 100, 200, 300, and 600 with a B1 bob, an R1 rotor, and a 1.0 spring. The dial readings, plastic viscosity, and yield points for the spacer fluids were measured in accordance with API Recommended Practices 10B, Bingham plastic model and are set forth in the table below. The abbreviation "PV" refers to plastic viscosity, while the abbreviation "YP" refers to yield point.

TABLE 2

| Sample Spacer Fluid | CKD-Fly Ash Ratio | Temp. (° F.) | Viscometer RPM | | | | | | | | PV (cP) | YP (lb/100 ft²) |
|---|---|---|---|---|---|---|---|---|---|---|---|---|
| | | | 600 | 300 | 200 | 100 | 60 | 30 | 6 | 3 | | |
| 3 | 100:0 | 80 | 33 | 23 | 20 | 15 | 13 | 12 | 8 | 6 | 12 | 11 |
| | | 130 | 39 | 31 | 27 | 23 | 22 | 19 | 16 | 11 | 12 | 19 |
| | | 180 | 66 | 58 | 51 | 47 | 40 | 38 | 21 | 18 | 16.5 | 41.5 |
| 4 | 75:25 | 80 | 28 | 22 | 19 | 15 | 14 | 11 | 8 | 6 | 10.5 | 11.5 |
| | | 130 | 39 | 28 | 25 | 21 | 19 | 16 | 14 | 11 | 10.5 | 17.5 |
| | | 180 | 51 | 39 | 36 | 35 | 31 | 26 | 16 | 11 | 6 | 33 |
| 5 | 50:50 | 80 | 20 | 11 | 8 | 6 | 5 | 4 | 4 | 3 | 7.5 | 3.5 |
| | | 130 | 21 | 15 | 13 | 10 | 9 | 8 | 6 | 5 | 7.5 | 7.5 |
| | | 180 | 25 | 20 | 17 | 14 | 13 | 12 | 7 | 5 | 9 | 11 |
| 6 | 25:75 | 80 | 16 | 8 | 6 | 3 | 2 | 1 | 0 | 0 | 7.5 | 0.5 |
| | | 130 | 15 | 8 | 6 | 4 | 3 | 2 | 1 | 1 | 6 | 2 |
| | | 180 | 15 | 9 | 7 | 5 | 4 | 2 | 2 | 2 | 6 | 3 |
| 7 (Comp.) | 0:100 | 80 | 16 | 7 | 5 | 3 | 1 | 0 | 0 | 0 | 6 | 1 |
| | | 130 | 11 | 4 | 3 | 1 | 0 | 0 | 0 | 0 | 4.5 | −0.5 |
| | | 180 | 8 | 3 | 2 | 0 | 0 | 0 | 0 | 0 | 4.5 | −1.5 |

Accordingly, the above example illustrates that the addition of CKD to a spacer fluid may provide suitable properties for use in subterranean applications. In particular, the above example illustrates, inter alia, that CKD may be used to provide a spacer fluid that may not exhibit thermal thinning with the spacer fluid potentially even having a yield point that increases with temperature. In addition, as illustrated in Table 2 above, higher yield points were observed for spacer fluids with higher concentrations of CKD.

Example 3

A sample spacer fluid containing CKD was prepared to compare the rheological properties of a spacer fluid containing CKD with an oil-based drilling fluid. The sample spacer fluid was prepared as follows. First, all dry components (e.g., CKD, fly ash, bentonite, etc.) were weighed into a glass container having a clean lid and agitated by hand until blended. Tap water was then weighed into a Waring blender jar. The dry components were then mixed into the water with 4,000 rpm stirring. The blender speed was then increased to 12,000 rpm for about 35 seconds.

Sample Spacer Fluid No. 8 was an 11 pound per gallon slurry that comprised 60.79% water, 30.42% CKD, 4.13% fly ash, 0.17% free water control additive (WG-17™ solid additive), 3.45% bentonite, and 1.04% Econolite™ additive.

The oil-based drilling fluid was a 9.1 pound per gallon oil-based mud.

Rheological values were then determined using a Fann Model 35 Viscometer. Dial readings were recorded at speeds of 3, 6, 100, 200, and 300 with a B1 bob, an R1 rotor, and a 1.0 spring. The dial readings, plastic viscosity, and yield points for the spacer fluid and drilling fluid were measured in accordance with API Recommended Practices 10B, Bingham plastic model and are set forth in the table below. The abbreviation "PV" refers to plastic viscosity, while the abbreviation "YP" refers to yield point. The abbreviation "OBM" refers to oil-based mud.

TABLE 3

| Sample Fluid | Temp. (° F.) | Viscometer RPM | | | | | PV (cP) | YP (lb/ 100 ft$^2$) |
| --- | --- | --- | --- | --- | --- | --- | --- | --- |
| | | 300 | 200 | 100 | 6 | 3 | | |
| 8 | 80 | 59 | 50 | 39 | 22 | 15 | 42 | 21.2 |
| | 180 | 82 | 54 | 48 | 16 | 13 | 65.3 | 17 |
| OBM | 80 | 83 | 64 | 41 | 11 | 10 | 74.6 | 12.1 |
| | 180 | 46 | 35 | 23 | 10 | 10 | 36.7 | 10.5 |

Accordingly, the above example illustrates that the addition of CKD to a spacer fluid may provide suitable properties for use in subterranean applications. In particular, the above example illustrates, inter alia, that CKD may be used to provide a spacer fluid with a yield point that is greater than a drilling fluid even at elevated temperatures. For example, Sample Spacer Fluid No. 8 has a higher yield point at 180° F. than the oil-based mud.

Example 4

A foamed spacer fluid (Sample Fluid 9) was prepared that comprised CKD. First, a base slurry was prepared that had a density of 10 ppg and comprised CKD, a free water control additive (0.7% by weight of CKD), a lightweight additive (4% by weight of CKD), and fresh water (32.16 gallons per 94-pound sack of CKD). The free water control additive was SA-1015™ suspending aid. The lightweight additive was ECONOLITE™ additive. Next, a foaming agent (FOAMER™ 760 foamer/stabilizer) in an amount of 2% bvow was added, and the base slurry was then mixed in a foam blending jar for 4 seconds at 12,000 rpm. The resulting foamed spacer fluid had a density of 8.4 ppg. The "sink" of the resultant foamed spacer fluid was then measured using a free fluid test procedure as specified in API Recommended Practice 10B. However, rather than measuring the free fluid, the amount of "sink" was measured after the foamed spacer fluid remained static for a period of 2 hours. The foamed spacer fluid was initially at 200° and cooled to ambient temperature over the 2-hour period. The measured sink for this foamed spacer fluid was 5 millimeters.

Example 5

Another foamed spacer fluid (Sample Fluid 10) was prepared that comprised CKD. First, a base slurry was prepared that had a density of 10.5 ppg and comprised CKD, a free water control additive (0.6% by weight of CKD), a lightweight additive (4% by weight of CKD), and fresh water (23.7 gallons per 94-pound sack of CKD). The free water control additive was SA-1015™ suspending aid. The lightweight additive was ECONOLITE™ additive. Next, a foaming agent (a hexylene glycol/cocobetaine blended surfactant) in an amount of 2% bvow was added, and the base slurry was then mixed in a foam blending jar for 6 seconds at 12,000 rpm. The resulting foamed spacer fluid had a density of 8.304 ppg. The resultant foamed spacer fluid had a sink of 0 millimeters, measured as described above for Example 4.

Example 6

The following series of tests were performed to determine the compressive strength of consolidating spacer fluids. Twenty-two samples, labeled sample fluids 11-32 in the table below, were prepared having a density of 12.5 ppg using various concentrations of additives. The amount of these additives in each sample fluid are indicated in the table below with "% by weight" indicating the amount of the particular component by weight of Additive 1+Additive 2. The abbreviation "gal/sk" in the table below indicates gallons of the particular component per 94-pound sack of Additive 1 and Additive 2.

The CKD used was supplied by Holcim (US) Inc., from Ada, Okla. The shale used was supplied by Texas Industries, Inc., from Midlothian, Tex. The pumice used was either DS-200 or DS-300 lightweight aggregate available from Hess Pumice Products, Inc. The silica flour used was SSA-1™ cement additive, from Halliburton Energy Services, Inc. The course silica flour used was SSA-2™ course silica flour, from Halliburton Energy Services, Inc. The metakaolin used was MetaMax® metakaolin, from BASF. The amorphous silica used was SILICALITE™ cement additive, from Halliburton Energy Services, Inc. The perlite used was supplied by Hess Pumice Products, Inc. The slag used was supplied by LaFarge North America. The Portland cement Interground with pumice was FineCem™ cement, from Halliburton Energy Services, Inc. The fly ash used was POZMIX® cement additive, from Halliburton Energy Services, Inc. The micro-fine cement used was MICRO MATRIX® having an average particle size of 7.5 microns, from Halliburton Energy Services, Inc. The rice husk ash used was supplied by Rice Hull Specialty Products, Stuttgart, Ark. The biopolymer used was supplied by CP Kelco, San Diego, Calif. The barite used was supplied by Baroid Industrial Drilling Products. The latex used was Latex 3000™ cement additive from Halliburton Energy Services, Inc. The ground rubber used was LIFE-CEM™ 100 from Halliburton Energy Services, Inc. The nano-clay used was supplied by Nanocor Inc. The set retarder used was SCR-100™ cement retarder, from Halliburton Energy Services, Inc. SCR-100™ cement retarder is a copolymer of acrylic acid and 2-acrylamido-2-methylpropane sulfonic acid.

After preparation, the sample fluids were allowed to cure for seven days in a 2" by 4" metal cylinder that was placed in a water bath at 180° F. to form set cylinders. Immediately after removal from the water bath, destructive compressive strengths were determined using a mechanical press in accordance with API RP 10B-2. The results of this test are set forth below.

TABLE 4

| Sample Fluid | Water gal/sk | Additive #1 Type | % by wt | Additive #2 Type | % by wt | Additive #3 Type | % by Wt | Cement Set Retarder % by wt | 7-Day Comp. Strength PSI |
|---|---|---|---|---|---|---|---|---|---|
| 11 | 5.72 | CKD | 50 | Shale | 50 | — | — | 0 | 510 |
| 12 | 4.91 | Pumice DS-200 | 50 | Lime | 50 | — | — | 1 | 646 |
| 13 | 5.88 | CKD | 50 | Silica Flour | 50 | — | — | 0 | 288 |
| 14 | 6.05 | CKD | 50 | Metakaolin | 50 | — | — | 0 | 104 |
| 15 | 5.71 | CKD | 50 | Amorphous Silica | 50 | — | — | 1 | 251 |
| 16 | 5.13 | CKD | 50 | Perlite | 50 | — | — | 0 | 1031 |
| 17 | 5.4 | CKD | 50 | Lime | 50 | — | — | 0 | 58 |
| 18 | 5.49 | CKD | 50 | Pumice DS-200 | 50 | — | — | 0 | 624 |
| 19 | 6.23 | CKD | 50 | Slag | 50 | — | — | 0 | 587 |
| 20 | 5.88 | CKD | 50 | Course Silica Flour | 50 | — | — | 0 | 1018 |
| 21 | 6.04 | CKD | 50 | Portland Cement Interground with Pumice | 50 | — | — | 1 | 1655 |
| 22 | 5.63 | CKD | 50 | Fly Ash | 50 | — | — | 0 | 870 |
| 23 | 5.49 | CKD | 50 | Pumice DS-325 | 50 | — | — | 0 | 680 |
| 24 | 5.03 | FlyAsh | 50 | Lime | 50 | — | — | 1 | 170 |
| 25 | 5.65 | Slag | 50 | Lime | 50 | — | — | 1 | 395 |
| 26 | 6.36 | CKD | 50 | Micro-fine cement | 50 | — | — | 2 | 788 |
| 27 | 6.08 | CKD | 80 | Rice Husk Ash | 20 | — | — | 1 | 203 |
| 28 | 5.42 | CKD | 50 | Biopolymer | 50 | — | — | 1 | 265 |
| 29 | 7.34 | CKD | 50 | Barite | 50 | — | — | 0 | 21 |
| 30 | 4.02 | CKD | 100 | — | — | Latex | 2 | 1 | 164.6 |
| 31 | 2.71 | CKD | 100 | — | — | Ground Rubber | 10 | 1 | 167.6 |
| 32 | 6.15 | CKD | 100 | — | — | Nano-Clay | 2 | 0 | 102.5 |

Accordingly, the above example illustrates that a consolidating spacer fluid comprising CKD may be capable of consolidation. For example, 7-day compressive strengths of 1000 psi or even higher were observed for certain sample slurries.

Example 7

The following series of tests were performed to evaluate the thickening times of consolidating spacer fluids. For this example, the thickening times for Sample Fluids 11-32 from Example 6 were determined. As indicated below, the compositions for Samples Fluids 11-32 were the same as from Example 6 except the concentration of the cement set retarder was adjusted for certain samples. The thickening time, which is the time required for the compositions to reach 70 Bearden units of consistency, was determined for each fluid at 230° F. in accordance with API RP 10B-2. The results of this test are set forth below.

TABLE 5

| Sample Fluid | Water gal/sk | Additive #1 Type | % by wt | Additive #2 Type | % by wt | Additive #3 Type | % by Wt | Cement Set Retarder % by wt | Thickening Time hr:min |
|---|---|---|---|---|---|---|---|---|---|
| 11 | 5.72 | CKD | 50 | Shale | 50 | — | — | 1 | 11:04 |
| 12 | 4.91 | Pumice DS-200 | 50 | Lime | 50 | — | — | 1 | 0:30 |
| 13 | 5.88 | CKD | 50 | Silica Flour | 50 | — | — | 1 | 3:31 |
| 14 | 6.05 | CKD | 50 | Metakaolin | 50 | — | — | 1 | 3:13 |
| 15 | 5.71 | CKD | 50 | Amorphous Silica | 50 | — | — | 1 | 2:15 |
| 16 | 5.13 | CKD | 50 | Perlite | 50 | — | — | 1 | 7:30 |
| 17 | 5.4 | CKD | 50 | Lime | 50 | — | — | 1 | 2:42 |
| 18 | 5.49 | CKD | 50 | Pumice DS-200 | 50 | — | — | 1 | 10:00 |
| 19 | 6.23 | CKD | 50 | Slag | 50 | — | — | 1 | 8:08 |
| 20 | 5.88 | CKD | 50 | Course Silica Flour | 50 | — | — | 1 | 20 hr+ |
| 21 | 6.04 | CKD | 50 | Portland Cement Interground with Pumice | 50 | — | — | 1 | 5:58 |

TABLE 5-continued

| Sample Fluid | Water gal/sk | Additive #1 Type | % by wt | Additive #2 Type | % by wt | Additive #3 Type | % by Wt | Cement Set Retarder % by wt | Thickening Time hr:min |
|---|---|---|---|---|---|---|---|---|---|
| 22 | 5.63 | CKD | 50 | Fly Ash | 50 | — | — | 1 | 12 hr+ |
| 23 | 5.49 | CKD | 50 | Pumice DS-325 | 50 | — | — | 1 | 7:30 |
| 24 | 5.03 | Fly Ash | 50 | Lime | 50 | — | — | 1 | 3:32 |
| 25 | 5.65 | Slag | 50 | Lime | 50 | — | — | 1 | 4:05 |
| 26 | 6.36 | CKD | 50 | Micro-fine cement | 50 | — | — | 2 | 1:30 |
| 27 | 6.08 | CKD | 80 | Rice Husk Ash | 20 | — | — | 1 | 30 hr+ |
| 28 | 5.42 | CKD | 50 | Biopolymer | 50 | — | — | 1 | 1:35 |
| 29 | 7.34 | CKD | 50 | Barite | 50 | — | — | 1 | 18 hr+ |
| 30 | 4.02 | CKD | 100 | — | — | Latex | 2 | 1 | 1:10 |
| 31 | 2.71 | CKD | 100 | — | — | Ground Rubber | 10 | 1 | 20 hr+ |
| 32 | 6.15 | CKD | 100 | — | — | Nano-Clay | 2 | 0 | 54:00 |

Accordingly, the above example illustrates that a settable spacer fluid may have acceptable thickening times for certain applications.

Example 8

The following series of tests were performed to evaluate the rheological properties of consolidating spacer fluids. For this example, the rheological properties of Sample Fluids 11-32 were determined. The rheological values were determined using a Fann Model 35 Viscometer. Dial readings were recorded at speeds of 3, 6, 30, 60, 100, 200, 300, and 600 with a B1 bob, an R1 rotor, and a 1.0 spring. An additional sample was used for this specific test. It is Sample Fluid 33 and comprised barite and 0.5% of a suspending agent by weight of the barite. The suspending agent was SA™-1015, available from Halliburton Energy Services, Inc. The water was included in an amount sufficient to provide a density of 12.5 ppg. Sample 33's rheological properties were measured twice at two different temperatures and the values per temperature were averaged to present the data shown below. Temperature is measured in degrees Fahrenheit. The results of this test are set forth below.

TABLE 6

| Sample Fluid | Additive #1 Type | % by wt | Additive #2 Type | % by wt | Additive #3 Type | % by wt | Temp. | Viscometer RPM 300 | 200 | 100 | 60 | 30 | 6 | 3 | 600 |
|---|---|---|---|---|---|---|---|---|---|---|---|---|---|---|---|
| 11 | CKD | 50 | Shale | 50 | — | — | 80 | 29 | 21 | 14 | 11 | 9 | 6 | 5 | 39 |
| 12 | Pumice DS-200 | 50 | Lime | 50 | — | — | 80 | 24 | 17 | 9 | 6 | 5 | 2 | 1 | 48 |
| 13 | CKD | 50 | Silica Flour | 50 | — | — | 80 | 16 | 12 | 8 | 6 | 5 | 4 | 3 | 24 |
| 14 | CKD | 50 | Metakaolin | 50 | — | — | 80 | 36 | 28 | 19 | 15 | 12 | 9 | 8 | 64 |
| 15 | CKD | 50 | Amorphous Silica | 50 | — | — | 80 | 31 | 24 | 18 | 14 | 12 | 10 | 9 | 49 |
| 16 | CKD | 50 | Perlite | 50 | — | — | 80 | 40 | 34 | 27 | 23 | 20 | 15 | 9 | 61 |
| 17 | CKD | 50 | Lime | 50 | — | — | 80 | 46 | 41 | 34 | 30 | 27 | 16 | 11 | 65 |
| 18 | CKD | 50 | Pumice DS-200 | 50 | — | — | 80 | 23 | 19 | 14 | 11 | 9 | 7 | 6 | 40 |
| 19 | CKD | 50 | Slag | 50 | — | — | 80 | 23 | 20 | 14 | 11 | 9 | 6 | 5 | 41 |
| 20 | CKD | 50 | Course Silica Flour | 50 | — | — | 80 | 27 | 19 | 12 | 9 | 7 | 4 | 3 | 64 |
| 21 | CKD | 50 | Portland Cement Interground with Pumice | 50 | — | — | 80 | 15 | 10 | 7 | 5 | 3 | 2 | 1 | 18 |
| 22 | CKD | 50 | Fly Ash | 50 | — | — | 80 | 12 | 9 | 6 | 4 | 3 | 2 | 1 | 21 |
| 23 | CKD | 50 | Pumice DS-325 | 50 | — | — | 80 | 39 | 32 | 24 | 21 | 17 | 12 | 7 | 57 |
| 24 | Fly Ash | 50 | Lime | 50 | — | — | 80 | 12 | 9 | 6 | 4 | 3 | 2 | 2 | 24 |
| 25 | Slag | 50 | Lime | 50 | — | — | 80 | 15 | 10 | 5 | 3 | 2 | 1 | 1 | 23 |
| 26 | CKD | 50 | Micro-fine cement | 50 | — | — | 80 | 10 | 7 | 4 | 3 | 2 | 1 | 0 | 14 |
| 27 | CKD | 80 | Rice Husk Ash | 20 | — | — | 80 | 24 | 15 | 9 | 7 | 5 | 3 | 2 | 41 |
| 28 | CKD | 50 | Biopolymer | 50 | — | — | 80 | 175 | 111 | 53 | 31 | 15 | 4 | 3 | 220 |
| 29 | CKD | 50 | Barite | 50 | — | — | 80 | 48 | 40 | 30 | 26 | 22 | 15 | 13 | 2 |
| 30 | CKD | 100 | — | — | Latex | 2 | 80 | 48 | 39 | 28 | 23 | 19 | 17 | 15 | 82 |
| 31 | CKD | 100 | — | — | Ground Rubber | 10 | 80 | 65 | 56 | 42 | 40 | 39 | 30 | 22 | 105 |

TABLE 6-continued

| | Additive #1 | | Additive #2 | | Additive #3 | | | Viscometer RPM | | | | | | | |
|---|---|---|---|---|---|---|---|---|---|---|---|---|---|---|---|
| Sample Fluid | Type | % by wt | Type | % by wt | Type | % by wt | Temp. | 300 | 200 | 100 | 60 | 30 | 6 | 3 | 600 |
| 32 | CKD | 100 | — | | — | Nano-Clay | 2 | 80 | 22 | 18 | 12 | 10 | 8 | 6 | 5 | 37 |
| 33 | Barite | 100 | — | | — | SA™-1015 | 0.5 | 80 | 41 | 36.5 | 30.5 | 28 | 25.5 | 20.5 | 18.5 | NA |
| 33 | Barite | 100 | — | | — | SA™-1015 | 0.5 | 180 | 38 | 35.5 | 32 | 30 | 28 | 23.5 | 22 | NA |

Accordingly, the above example indicates that a consolidating spacer fluid may have acceptable rheological properties for a particular application.

Example 9

The following series of tests were performed to further evaluate the compressive strength of consolidating spacer fluids. Ten samples, labeled Sample Fluids 34-43 in the table below were prepared, having a density of 13 ppg using various concentrations of additives. The amount of these additives in each sample are indicated in the table below with "% by weight" indicating the amount of the particular component by weight of the dry solids, which is the CKD, the Portland cement, the cement accelerator, the fly ash, and/or the lime. The abbreviation "gal/sk" in the table below indicates gallons of the particular component per 94-pound sack of the dry solids.

The CKD used was Mountain CKD from Laramie Wyo., except for Sample Fluid 43 which used CKD from Holcim (US) Inc., Ada, Okla. The Portland cement used in Sample Fluids 34 and 35 was CEMEX Type 3 Portland cement, from CEMEX USA. The cement accelerator used in Sample Fluid 34 was CAL-SEAL™ accelerator, from Halliburton Energy Services Inc. CAL-SEAL™ Accelerator is gypsum. The Class F fly ash used in Slurries 37-41 was from Coal Creek Station. The Class C fly ash used in Slurries 36 was from LaFarge North America.

After preparation, the samples were allowed to cure for twenty-four or forty-eight hours in a 2" by 4" metal cylinder that was placed in a water bath at 160° F. to form set cylinders. For certain samples, separate cylinders were cured for twenty-four hours and forty-eight hours. Immediately after removal from the water bath, destructive compressive strengths were determined using a mechanical press in accordance with API RP 10B-2. The results of this test are set forth below.

Accordingly, the above example illustrates that a consolidating spacer fluid may have acceptable compressive strengths for certain applications.

Example 10

The following series of tests were performed to evaluate the static gel strength development of consolidating spacer fluids. Two samples, labeled Sample Fluids 44 and 45 were prepared having a density of 11 and 13.5 ppg respectively using various concentrations of additives. The component concentrations of each sample are as follows:

For Sample Fluid 44, the sample comprised a blend of CKD (80% by weight), fly ash (16% by weight) and hydrated lime (4% by weight). The sample also comprised a suspending aid in an amount of 0.4% by weight of the blend. Sufficient water was included in the sample to provide a density of 11 ppg. The CKD used was from Holcim (US) Inc., Ada, Okla. The fly ash used was POZMIX® cement additive, from Halliburton Energy Services, Inc. The suspending agent was SA™-1015, available from Halliburton Energy Services, Inc.

For Sample Fluid 45, the sample comprised a mixture of CKD (80% by weight), fly ash (16% by weight), and hydrate lime (4% by weight). Sufficient water was included in the sample to provide a density of 13.5 ppg. The CKD used was from Holcim (US) Inc., Ada, Okla. The fly ash used was POZMIX® cement additive, from Halliburton Energy Services, Inc.

Figure 2:
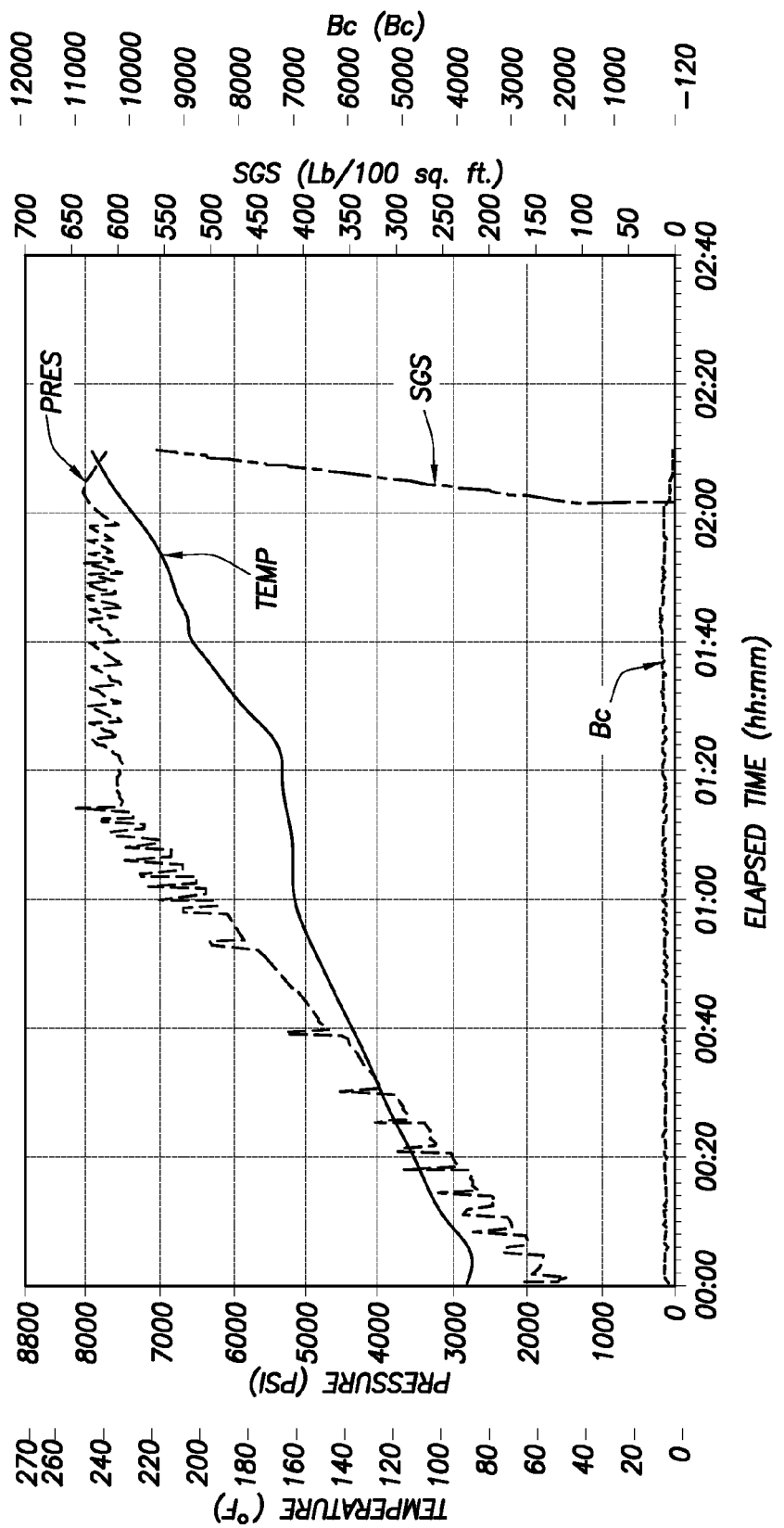
FIG. 2 is a graph showing measured static gel strength values at various temperature and pressure readings as a factor of time for an example consolidating spacer fluid.

The static gel strength of the samples was measured in accordance with API Recommended Practice on *Determining the Static Gel Strength of Cement Formations*, ANSI/API Recommended Practice 10B-6. FIGS. 1 and 2 show the static gel strength measurements for Sample Fluids 44 and 45, respectively, as a function of time. As seen in the figures, the samples progress through the transition time, defined as the time between 100 SGS and 500 SGS, very quickly with a total

TABLE 7

| Sample Fluid | Water gal/sk | CKD % by wt | Portland Cement % by wt | Cement Accel. % by wt | Class F Fly Ash % by wt | Class C Fly Ash % by wt | Lime % by wt | 24-Hr Comp. Strength PSI | 48-Hr Comp. Strength PSI |
|---|---|---|---|---|---|---|---|---|---|
| 34 | 8.75 | 85 | 10 | 5 | 0 | 0 | 0 | 73.4 | — |
| 35 | 8.75 | 90 | 10 | 0 | 0 | 0 | 0 | 99.8 | — |
| 36 | 8.14 | 70 | 0 | 0 | 0 | 30 | 0 | 210 | — |
| 37 | 8.25 | 70 | 0 | 0 | 25 | 0 | 5 | 388 | — |
| 38 | 8.20 | 75 | 0 | 0 | 21 | 0 | 4 | 300 | 784 |
| 39 | 8.27 | 80 | 0 | 0 | 17.5 | 0 | 2.5 | 224 | 641 |
| 40 | 9.61 | 70 | 0 | 0 | 25 | 0 | 5 | 219 | 567 |
| 41 | 11.5 | 70 | 0 | 0 | 25 | 0 | 5 | 165 | 369 |
| 42 | 5.12 | 100 | 0 | 0 | 0 | 0 | 0 | 36.2 | — |
| 43 | 5.12 | 100 | 0 | 0 | 0 | 0 | 0 | 60.8 | — | transition time of 19 minutes for the sample 34 and 6 minutes for sample 35. These short transition times are faster than most cement compositions.

Example 11

The following tests were performed to evaluate the static gel strength development of consolidating spacer fluids. Two samples, labeled Samples Fluids 46 and 47 were prepared having a density of 13.002 and 10.999 ppg respectively using various concentrations of additives. The component concentrations of each sample are as follows:

For Sample Fluid 46, the sample comprised a blend of CKD (100% by weight), POZMIX® (50% by weight of the CKD), He-601 (1% by weight of the CKD), HR®-25 (PB) (0.6% by weight of the CKD), and D-Air 5000 (0.5% by weight of the CKD). Sufficient water was included in the sample to provide a density of 13.002 ppg. The CKD used was from Holcim (US) Inc., Ada, Okla. POZMIX® cement additive is from Halliburton Energy Services, Inc. He-601 is a cement retarder available from Halliburton Energy Services, Inc. HR®-25 is a cement retarder available from Halliburton Energy Services, Inc. D-Air™ 5000 is a defoamer available from Halliburton Energy Services, Inc.

For Sample Fluid 47, the sample comprised a blend of CKD (100% by weight), SA-1015 (0.4% by weight of the CKD), and D-Air 5000 (0.5% by weight of the CKD). Sufficient water was included in the sample to provide a density of 10.999 ppg. The CKD used was from Holcim (US) Inc., Ada, Okla. SA™-1015 is a suspending agent available from Halliburton Energy Services, Inc. D-Air™ 5000 is a defoamer available from Halliburton Energy Services, Inc.

The static gel strength of the samples was measured in accordance with API Recommended Practice on *Determining the Static Gel Strength of Cement Formations*, ANSI/API Recommended Practice 10B-6. Table 8 shows the static gel strength measurements for samples 36 and 37, respectively.

TABLE 8

| Sample Fluid | Temp (° F.) | Time to reach 100 lbf/100 ft$^s$ (hr:min) | Time to reach 500 lbf/100 ft$^s$ (hr:min) | Difference between 100 lbf/ 100 ft$^s$ and 500 lbf/100 ft$^s$ (hr:min) |
|---|---|---|---|---|
| 46 | 220 | 3:25 | 5:04 | 1:39 |
| 47 | 220 | 3:07 | 3:17 | 00:10 |

As seen in the table, Sample Fluid 47 progresses through the transition time, defined as the time between 100 SGS and 500 SGS, very quickly with a total transition time of 10 minutes. Sample Fluid 46 is much slower taking over an hour to progress through the transition time. The short transition time of Sample Fluid 47 is faster than most cement compositions.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of displacing a drilling fluid disposed in a well bore annulus, comprising:
    providing a spacer fluid comprising a kiln dust, wherein the spacer fluid has at least one property at well bore conditions, wherein the property is selected from the group consisting of: (i) a yield point of from about 25 Pascals to about 250 Pascals, (ii) a static gel strength of from about 70 lbf/100 ft$^2$ to about 500 lbf/100 ft$^2$, (iii) a yield limit in compression from about 1 psi to about 2,000 psi, (iv) an unconfined uniaxial compressive strength of from about 5 psi to about 10,000 psi, (v) a zero gel time of about 8 hours or less, and (vi) a transition time of about 45 minutes or less;
    using the spacer fluid to displace at least a portion of the drilling fluid from the well bore annulus; and
    allowing at least a portion of the spacer fluid to consolidate in the well bore annulus, and wherein the portion of the spacer fluid consolidates in the well bore to meet the property.

2. The method of claim 1 wherein the drilling fluid comprises an oil-based drilling fluid.

3. The method of claim 1 wherein the kiln dust comprises cement kiln dust.

4. The method of claim 1 wherein the kiln dust comprises lime kiln dust.

5. The method of claim 1 wherein the spacer fluid comprises the kiln dust in an amount in a range of from about 1% to about 60% by weight of the spacer fluid.

6. The method of claim 1 further comprising introducing a cement composition into the well bore annulus after the spacer fluid, wherein the spacer fluid separates the cement composition from the drilling fluid.

7. The method of claim 1 further comprising running a bond log on the at least a portion of the spacer fluid in the well bore annulus to measure bonding of the spacer fluid to a pipe string in the well bore.

8. The method of claim 1 wherein the spacer fluid is foamed and has a density in a range of from about 4 pounds per gallon to about 13 pounds per gallon.

9. The method of claim 1 wherein the spacer fluid comprises at least one additive selected from the group consisting of a free water control additive, a lightweight additive, a foaming agent, a supplementary cementitious material, a weighting agent, a viscosifying agent, a fluid loss control agent, a lost circulation material, a filtration control additive, a dispersant, a defoamer, a corrosion inhibitor, a scale inhibitor, a formation conditioning agent, a water-wetting surfactant, and any combination thereof.

10. The method of claim 1 wherein the spacer fluid comprises at least one additive selected from the group consisting of cement kiln dust, lime kiln dust, gypsum, fly ash, bentonite, hydroxyethyl cellulose, sodium silicate, a hollow microsphere, gilsonite, perlite, a gas, an organic polymer, a biopolymer, latex, ground rubber, a surfactant, crystalline silica, amorphous silica, silica flour, fumed silica, nano-clay, salt, fiber, hydratable clay, rice husk ash, micro-fine cement, metakaolin, zeolite, shale, pumicite, Portland cement, Portland cement interground with pumice, barite, slag, lime, and any combination thereof.

11. The method of claim 1 wherein the spacer fluid comprises at least one cementitious material selected from the group consisting of Portland cement, Portland cement interground with pumice, micro-fine cement, slag, fly ash, rice husk ash, pumicite, gypsum, and any combination thereof.

12. The method of claim 1 wherein the at least a portion of the spacer fluid consolidates in the well bore annulus to have a static gel strength of from about 70 lbf/100 ft$^2$ to about 500 lbf/100 ft$^2$ and/or a yield point of from about 25 Pascals to about 250 Pascals.

13. The method of claim 1 wherein the at least a portion of the spacer fluid consolidates in the well bore annulus to have a yield limit in compression from about 1 psi to about 2,000 psi.

14. The method of claim 1 wherein the at least a portion of the spacer fluid consolidates in the well bore annulus to have an unconfined uniaxial compressive strength of from about 5 psi to about 10,000 psi.

15. The method of claim 1 wherein the at least a portion of the spacer fluid has a zero gel time of about 4 hours or less.

16. The method of claim 1 wherein the at least a portion of the spacer fluid consolidates to develop a static gel strength of about 500 lbf/100 ft$^2$ or more in a time from about 10 minutes to about 8 hours.

17. The method of claim 1 wherein the at least a portion of the spacer fluid has a transition time of about 45 minutes or less.

18. The method of claim 1 wherein the predetermined well bore conditions comprise temperature and pressure.

19. The method of claim 1 further comprising introducing a cement composition into the well bore annulus, wherein the spacer fluid separates the cement composition from the drilling fluid, and wherein the at least a portion of the spacer fluid consolidates in the well bore annulus to have a transition time that is shorter than a transition time of the cement composition.

20. The method of claim 1 wherein the at least a portion of the spacer fluid has a transition time of about 20 minutes or less.

21. The method of claim 1 further comprising measuring consolidating properties of the spacer fluid in the well bore annulus.

22. The method of claim 1 wherein the spacer fluid comprises the kiln dust in an amount in a range of from about 80% to about 90% by weight of dry solids.

23. A method of displacing a drilling fluid disposed in a well bore annulus, comprising:
using a consolidating spacer fluid to displace at least a portion of the drilling fluid from the well bore annulus, wherein the consolidating spacer fluid comprises a kiln dust; and
allowing at least a portion of the consolidating spacer fluid to consolidate in the well bore annulus wherein the at least a portion of the consolidating spacer fluid has a zero gel time of about 4 hours or less, and wherein the at least a portion of the consolidating spacer fluid consolidates to have at least one property selected from the group consisting of: (i) a yield point of from about 25 Pascals to about 250 Pascals, (ii) a static gel strength of from about 70 lbf/100 ft$^2$ to about 500 lbf/100 ft$^2$, (iii) a yield limit in compression from about 1 psi to about 2,000 psi, and (iv) an unconfined uniaxial compressive strength of from about 5 psi to about 10,000 psi.

24. The method of claim 23 wherein the kiln dust comprises cement kiln dust.

25. The method of claim 23 wherein the consolidating spacer fluid comprises at least one additive selected from the group consisting of cement kiln dust, lime kiln dust, gypsum, fly ash, bentonite, hydroxyethyl cellulose, sodium silicate, a hollow microsphere, gilsonite, perlite, a gas, an organic polymer, a biopolymer, latex, ground rubber, a surfactant, crystalline silica, amorphous silica, silica flour, fumed silica, nano-clay, salt, fiber, hydratable clay, rice husk ash, micro-fine cement, metakaolin, zeolite, shale, pumicite, Portland cement, Portland cement interground with pumice, barite, slag, lime, and any combination thereof.

26. The method of claim 23 further comprising introducing a cement composition into the well bore annulus, wherein the consolidating spacer fluid separates the cement composition from the drilling fluid.

27. The method of claim 23 wherein the at least a portion of the consolidating spacer fluid consolidates in the well bore annulus to have a transition time that is shorter than a transition time of the cement composition.

28. The method of claim 23 wherein the at least a portion of the consolidating spacer fluid has a transition time of about 45 minutes or less.

29. The method of claim 23 wherein the at least a portion of the consolidating spacer fluid has a transition time of about 20 minutes or less.

30. The method of claim 23 wherein the at least a portion of the consolidating spacer fluid consolidates in the well bore annulus to have a yield limit in compression from about 1 psi to about 2,000 psi.

31. The method of claim 23 wherein the at least a portion of the consolidating spacer fluid consolidates in the well bore annulus to have an unconfined uniaxial compressive strength of from about 5 psi to about 10,000 psi.

32. The method of claim 23 wherein the at least a portion of the consolidating spacer fluid consolidates to develop a static gel strength of about 500 lbf/100 ft$^2$ or more in a time from about 10 minutes to about 8 hours.

33. The method of claim 23 wherein the consolidating spacer fluid is foamed and has a density in a range of from about 4 pounds per gallon to about 13 pounds per gallon.

34. The method of claim 23 further comprising measuring consolidating properties of the consolidating spacer fluid in the well bore annulus.

35. A method of displacing a drilling fluid disposed in a well bore annulus, comprising:
using a consolidating spacer fluid to displace at least a portion of the drilling fluid from the well bore annulus, wherein the consolidating spacer fluid comprises a kiln dust; and
allowing at least a portion of the consolidating spacer fluid to consolidate in the well bore annulus, wherein the at least a portion of the consolidating spacer fluid has a transition time of about 45 minutes or less, and wherein the at least a portion of the consolidating spacer fluid consolidates to have at least one property selected from the group consisting of: (i) a yield point of from about 25 Pascals to about 250 Pascals, (ii) a static gel strength of from about 70 lbf/100 ft$^2$ to about 500 lbf/100 ft$^2$, (iii) a yield limit in compression from about 1 psi to about 2,000 psi, and (iv) an unconfined uniaxial compressive strength of from about 5 psi to about 10,000 psi.

36. The method of claim 35 wherein the kiln dust comprises cement kiln dust.

37. The method of claim 35 wherein the consolidating spacer fluid comprises at least one additive selected from the group consisting of cement kiln dust, lime kiln dust, gypsum, fly ash, bentonite, hydroxyethyl cellulose, sodium silicate, a hollow microsphere, gilsonite, perlite, a gas, an organic polymer, a biopolymer, latex, ground rubber, a surfactant, crystalline silica, amorphous silica, silica flour, fumed silica, nano-clay, salt, fiber, hydratable clay, rice husk ash, micro-fine cement, metakaolin, zeolite, shale, pumicite, Portland cement, Portland cement interground with pumice, barite, slag, lime, and any combination thereof.

38. The method of claim 35 further comprising introducing a cement composition into the well bore annulus, wherein the consolidating spacer fluid separates the cement composition from the drilling fluid.

39. The method of claim 38 wherein the transition time of the at least a portion of the consolidating spacer fluid is shorter than a transition time of the cement composition.

40. The method of claim 35 wherein the transition time of the at least a portion of the consolidating spacer fluid is about 20 minutes or less.

41. The method of claim 35 wherein the at least a portion of the consolidating spacer fluid consolidates in the well bore annulus to have a yield limit in compression from about 1 psi to about 2,000 psi.

42. The method of claim 35 wherein the at least a portion of the consolidating spacer fluid consolidates in the well bore annulus to have an unconfined uniaxial compressive strength of from about 5 psi to about 10,000 psi.

43. The method of claim 35 wherein the at least a portion of the consolidating spacer fluid consolidates to develop a static gel strength of about 500 lbf/100 ft$^2$ or more in a time from about 10 minutes to about 4 hours.

44. The method of claim 35 wherein the consolidating spacer fluid is foamed and has a density in a range of from about 4 pounds per gallon to about 13 pounds per gallon.

45. The method of claim 35 further comprising measuring consolidating properties of the consolidating spacer fluid in the well bore annulus.

46. A method of displacing a drilling fluid disposed in a well bore annulus, comprising:
introducing a consolidating spacer fluid into the well bore annulus to displace at least a portion of the drilling fluid from the well bore annulus; and
allowing at least a portion of the consolidating spacer fluid to consolidate in the well bore annulus to have at least one property selected from the group consisting of: (i) a yield point of from about 25 Pascals to about 250 Pascals, (ii) a static gel strength of from about 70 lbf/100 ft$^2$ to about 500 lbf/100 ft$^2$, (iii) a yield limit in compression from about 1 psi to about 2,000 psi, and (iv) an unconfined uniaxial compressive strength of from about 5 psi to about 10,000 psi;
wherein the consolidating spacer fluid comprises water a kiln dust, and at least one additive selected from the group consisting of gypsum, fly ash, bentonite, hydroxyethyl cellulose, sodium silicate, a hollow microsphere, gilsonite, perlite, a gas, an organic polymer, a biopolymer, latex, ground rubber, a surfactant, crystalline silica, amorphous silica, silica flour, fumed silica, nano-clay, salt, fiber, hydratable clay, rice husk ash, micro-fine cement, metakaolin, zeolite, shale, pumicite, Portland cement, Portland cement interground with pumice, barite, slag, lime, and any combination thereof; and
wherein the portion of the consolidating spacer fluid has a zero gel time of about 4 hours or less.

47. The method of claim 46 wherein the drilling fluid comprises an oil-based drilling fluid.

48. The method of claim 46 wherein the kiln dust and the kiln dust comprises cement kiln dust.

49. The method of claim 46 wherein the kiln dust comprises lime kiln dust.

50. The method of claim 46 wherein the kiln dust is present in the consolidating spacer fluid in an amount in a range of from about 1% to about 60% by weight of the consolidating spacer fluid.

51. The method of claim 46 wherein the consolidating spacer fluid comprises the fly ash.

52. The method of claim 46 further comprising introducing a cement composition into the well bore annulus after the consolidating spacer fluid, wherein the consolidating spacer fluid separates the cement composition from the drilling fluid.

53. The method of claim 46 wherein the consolidating spacer fluid is foamed and has a density in a range of from about 4 pounds per gallon to about 13 pounds per gallon.

54. The method of claim 46 wherein the at least a portion of the consolidating spacer fluid has a transition time of about 45 minutes or less.

55. The method of claim 46 wherein the at least a portion of the consolidating spacer fluid has a transition time of about 20 minutes or less.

56. The method of claim 46 further comprising measuring consolidating properties of the consolidating spacer fluid in the well bore annulus.

57. A method of displacing a drilling fluid disposed in a well bore annulus, comprising:
using a consolidating spacer fluid to displace at least a portion of the drilling fluid from the well bore annulus;
introducing a cement composition into the well bore annulus, wherein the consolidating spacer fluid separates the cement composition from the drilling fluid; and
allowing at least a portion of the consolidating spacer fluid to consolidate in the well bore annulus, wherein the at least a portion of the consolidating spacer fluid has a transition time that is shorter than a transition time of the cement composition.

58. The method of claim 57 wherein the drilling fluid comprises an oil-based drilling fluid.

59. The method of claim 57 wherein the consolidating spacer fluid comprises cement kiln dust.

60. The method of claim 57 wherein the consolidating spacer fluid comprises lime kiln dust.

61. The method of claim 57 wherein the consolidating spacer fluid comprises a kiln dust.

62. The method of claim 61 wherein the consolidating spacer fluid comprises the kiln dust in an amount in a range of from about 1% to about 60% by weight of the spacer fluid.

63. The method of claim 61 wherein the consolidating spacer fluid comprises the kiln dust in an amount in a range of from about 80% to about 90% by weight of dry solids.

64. The method of claim 57 further comprising measuring consolidation properties of the consolidating spacer fluid in the well bore annulus.

65. The method of claim 57 further comprising running a bond log on the at least a portion of the spacer fluid in the well bore annulus to measure bonding of the consolidating spacer fluid to a pipe string in the well bore.

66. The method of claim 57 wherein the consolidating spacer fluid is foamed and has a density in a range of from about 4 pounds per gallon to about 13 pounds per gallon.

67. The method of claim 57 wherein the consolidating spacer fluid comprises at least one additive selected from the group consisting of a free water control additive, a lightweight additive, a foaming agent, a supplementary cementitious material, a weighting agent, a viscosifying agent, a fluid loss control agent, a lost circulation material, a filtration control additive, a dispersant, a defoamer, a corrosion inhibitor, a scale inhibitor, a formation conditioning agent, a water-wetting surfactant, and any combination thereof.

68. The method of claim 57 wherein the consolidating spacer fluid comprises at least one additive selected from the group consisting of cement kiln dust, lime kiln dust, gypsum, fly ash, bentonite, hydroxyethyl cellulose, sodium silicate, a hollow microsphere, gilsonite, perlite, a gas, an organic polymer, a biopolymer, latex, ground rubber, a surfactant, crystalline silica, amorphous silica, silica flour, fumed silica, nano-clay, salt, fiber, hydratable clay, rice husk ash, micro-fine cement, metakaolin, zeolite, shale, pumicite, Portland cement, Portland cement interground with pumice, barite, slag, lime, and any combination thereof.

69. The method of claim 57 wherein the consolidating spacer fluid comprises at least one cementitious material selected from the group consisting of Portland cement, Portland cement interground with pumice, micro-fine cement, slag, fly ash, rice husk ash, pumicite, gypsum, and any combination thereof.

70. The method of claim 57 wherein the at least a portion of the consolidating spacer fluid consolidates in the well bore annulus to have a static gel strength of from about 70 lbf/100 ft$^2$ to about 500 lbf/100 ft$^2$ and/or a yield point of from about 25 Pascals to about 250 Pascals.

71. The method of claim 57 wherein the at least a portion of the consolidating spacer fluid consolidates in the well bore annulus to have a yield limit in compression from about 1 psi to about 2,000 psi.

72. The method of claim 57 wherein the at least a portion of the consolidating spacer fluid consolidates in the well bore annulus to have an unconfined uniaxial compressive strength of from about 5 psi to about 10,000 psi.

73. The method of claim 57 wherein the at least a portion of the consolidating spacer fluid has a zero gel time of about 8 hours or less.

74. The method of claim 57 wherein the at least a portion of the consolidating spacer fluid consolidates to develop a static gel strength of about 500 lbf/100 ft$^2$ or more in a time from about 10 minutes to about 8 hours.

75. The method of claim 57 wherein the at least a portion of the consolidating spacer fluid has a transition time of about 45 minutes or less.

76. The method of claim 57 wherein the at least a portion of the consolidating spacer fluid has a transition time of about 20 minutes or less.

* * * * *